US011951393B2

(12) United States Patent
Fukawa et al.

(10) Patent No.: US 11,951,393 B2
(45) Date of Patent: Apr. 9, 2024

(54) GAME SYSTEM, TERMINAL APPARATUS, AND RECORDING MEDIUM

(71) Applicant: KONAMI DIGITAL ENTERTAINMENT CO., LTD., Tokyo (JP)

(72) Inventors: Takayuki Fukawa, Tokyo (JP); Nobuhiro Goto, Tokyo (JP); Hiroki Koketsu, Tokyo (JP); Mariayuri Kumagae, Tokyo (JP); Yoji Takeuchi, Tokyo (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 58 days.

(21) Appl. No.: 16/996,294

(22) Filed: Aug. 18, 2020

(65) Prior Publication Data

US 2020/0376378 A1 Dec. 3, 2020

Related U.S. Application Data

(63) Continuation of application No. PCT/JP2018/036413, filed on Sep. 28, 2018.

(30) Foreign Application Priority Data

Feb. 19, 2018 (JP) .................................. 2018-027410

(51) Int. Cl.
*A63F 13/45* (2014.01)
*A63F 13/60* (2014.01)
*A63F 13/77* (2014.01)

(52) U.S. Cl.
CPC .............. *A63F 13/45* (2014.09); *A63F 13/60* (2014.09); *A63F 13/77* (2014.09); *A63F 2300/5533* (2013.01)

(58) Field of Classification Search
CPC ........ A63F 13/45; A63F 13/49; A63F 13/497; A63F 13/50; A63F 13/60;
(Continued)

(56) References Cited

U.S. PATENT DOCUMENTS 5,586,257 A * 12/1996 Perlman ................... A63F 13/12
463/42
5,695,400 A * 12/1997 Fennell, Jr. .............. A63F 13/12
463/42

(Continued)

FOREIGN PATENT DOCUMENTS

CN 1917927 A * 2/2007 ............. A63F 13/12
EP 1867369 A1 * 12/2007 ............. A63F 13/08
(Continued)

OTHER PUBLICATIONS

Machine translation of JPH11347254A. Publication date Dec. 21, 1999. Source: https://patents.google.com/patent/JPH11347254A/en?oq=JPH11347254A. (Year: 1999).*

(Continued)

*Primary Examiner* — Steven J Hylinski
(74) *Attorney, Agent, or Firm* — Sughrue Mion, PLLC

(57) ABSTRACT

A program causes a processor of a terminal apparatus to function as: a game progressor configured to progress a game based on content information that prescribes progression contents of the game; a first acquirer configured to acquire first progression information indicative of the degree of progress of the game in the terminal apparatus; a second acquirer configured to acquire input information that was input at another terminal apparatus progressing the game based on the content information, and second progression information indicative of the degree of progress of the game in the other terminal apparatus as of a point in time when the input information was input at the other terminal apparatus; and an output controller configured to control output of (Continued)

output information that corresponds to the input information acquired by the second acquirer based on the first progression information and the second progression information.

20 Claims, 17 Drawing Sheets

(58) Field of Classification Search
CPC .......... A63F 2300/294; A63F 2300/535; A63F 2300/5533; A63F 2300/63; A63F 2300/638
See application file for complete search history.

(56) References Cited

U.S. PATENT DOCUMENTS

| | | | | |
|---|---|---|---|---|
| 5,775,996 | A * | 7/1998 | Othmer | A63F 13/12 463/40 |
| 5,820,463 | A * | 10/1998 | O'Callaghan | H04L 29/06 463/42 |
| 5,974,442 | A * | 10/1999 | Adams | A63F 13/12 709/200 |
| 6,012,096 | A * | 1/2000 | Link | H04L 29/06 709/233 |
| 6,042,477 | A * | 3/2000 | Addink | A63F 13/12 463/42 |
| 6,304,902 | B1 * | 10/2001 | Black | H04L 43/00 709/223 |
| 6,475,090 | B2 * | 11/2002 | Roelofs | A63F 13/31 463/42 |
| 7,133,927 | B2 * | 11/2006 | Guo | H04L 29/06 709/205 |
| 7,244,181 | B2 * | 7/2007 | Wang | G07F 17/32 463/42 |
| 8,002,636 | B2 * | 8/2011 | Nogami | A63F 13/92 463/42 |
| 8,676,911 | B1 * | 3/2014 | Parkinson | H04N 21/4882 709/219 |
| 9,002,942 | B2 * | 4/2015 | Klein | G06Q 10/101 709/204 |
| 9,628,524 | B2 * | 4/2017 | Baggott | H04L 65/403 |
| 9,648,386 | B2 * | 5/2017 | Friedrich | H04N 21/4821 |
| 10,031,903 | B2 * | 7/2018 | Haynes, II | G06Q 30/0201 |
| 10,091,149 | B2 * | 10/2018 | Jung | H04L 51/212 |
| 2003/0123491 | A1 * | 7/2003 | Couillard | H04J 3/0667 370/508 |
| 2003/0204565 | A1 * | 10/2003 | Guo | H04L 47/283 709/205 |
| 2004/0152519 | A1 * | 8/2004 | Wang | G06Q 30/00 463/42 |
| 2009/0164484 | A1 * | 6/2009 | Horowitz | H04N 21/4532 |
| 2009/0286604 | A1 * | 11/2009 | Clowes | A63F 13/12 463/42 |
| 2010/0081504 | A1 * | 4/2010 | Fujisawa | A63F 13/12 463/31 |
| 2010/0119215 | A1 * | 5/2010 | Chien | G11B 27/36 386/241 |
| 2011/0010774 | A1 * | 1/2011 | Park | H04N 21/4788 709/248 |
| 2011/0047117 | A1 * | 2/2011 | Sinha | H04L 67/306 706/47 |
| 2011/0238853 | A1 * | 9/2011 | Paul | H04N 21/43074 707/610 |
| 2011/0252341 | A1 * | 10/2011 | Leahy | H04L 67/51 715/757 |
| 2012/0072941 | A1 * | 3/2012 | Thornberry | H04N 21/435 725/14 |
| 2012/0308206 | A1 * | 12/2012 | Kulas | H04N 21/812 386/E5.009 |
| 2013/0130794 | A1 * | 5/2013 | Oshima | A63F 13/87 463/31 |
| 2013/0217478 | A1 * | 8/2013 | Anderson | G07F 17/323 463/31 |
| 2013/0275519 | A1 * | 10/2013 | Nichols | H04L 67/75 709/206 |
| 2013/0294755 | A1 * | 11/2013 | Arme | G11B 27/28 386/E5.041 |
| 2014/0101244 | A1 * | 4/2014 | Klein | G06Q 10/00 709/204 |
| 2014/0297260 | A1 * | 10/2014 | Allen | G06F 3/04842 704/9 |
| 2014/0297745 | A1 * | 10/2014 | Tarbox | H04L 65/4053 709/204 |
| 2016/0295161 | A1 * | 10/2016 | Pratt | H04N 7/147 |
| 2017/0050111 | A1 * | 2/2017 | Perry | H04L 67/38 |
| 2018/0152759 | A1 * | 5/2018 | Miller | G06F 16/2455 |
| 2019/0191199 | A1 * | 6/2019 | Patel | H04H 60/27 |
| 2019/0232168 | A1 * | 8/2019 | Benedetto | A63F 13/5375 |
| 2021/0176529 | A1 * | 6/2021 | Patel | H04N 21/4334 |

FOREIGN PATENT DOCUMENTS

| | | | | |
|---|---|---|---|---|
| JP | 11-347254 A | | 12/1999 | |
| JP | 4086453 B2 * | | 5/2008 | |
| JP | 2009-90025 A | | 4/2009 | |
| JP | 5160704 B2 * | | 3/2013 | ............ A63F 13/12 |
| JP | 2014-144369 A | | 8/2014 | |
| JP | 2017509382 A * | | 4/2017 | |
| KR | 10-2010-0037548 A | | 4/2010 | |
| KR | 20180099532 A * | | 2/2018 | ............ A63F 13/79 |
| WO | WO-2016210070 A1 * | | 12/2016 | ............ A63F 13/31 |

OTHER PUBLICATIONS

International Search Report dated Dec. 18, 2018 from the International Searching Authority in International Application No. PCT/JP2018/036413.
Written Opinion dated Dec. 18, 2018 from the International Bureau in International Application No. PCT/JP2018/036413.
Office Action dated Mar. 15, 2022 in Korean Application No. 10-2020-7025486.
Office Action dated Sep. 28, 2022 in Korean Application No. 10-2020-7025486.

* cited by examiner

FIG. 8

| USER INFO | | USER CHARACTER INFO | | | | | | | |
|---|---|---|---|---|---|---|---|---|---|
| | | | | | | ABILITY INFO | | | |
| USER ID | USER NAME | TEAM NAME | CHARA-CTER ID | CHARA-CTER NAME | ROLE INFO | PASS-ING ABILITY INFO | SHOOT-ING ABILITY INFO | DRIBBL-ING ABILITY INFO | ... |
| u001 | tanaka | AAA | c001 | XXX | FORWARD | 6 | 9 | 8 | ... |
| | | | c002 | YYY | DEFENDER | 5 | 4 | 7 | ... |
| | | | c003 | ZZZ | GOALKEEPER | 2 | 3 | 3 | ... |
| | | | ... | ... | ... | ... | ... | ... | ... |
| u002 | suzuki | BBB | c101 | UUU | STRIKER | 5 | 8 | 7 | ... |
| | | | c102 | VVV | DEFENDER | 6 | 6 | 8 | ... |
| | | | c103 | WWW | MIDFIELDER | 9 | 7 | 9 | ... |
| | | | ... | ... | ... | ... | ... | ... | ... |

| USER ID | SCORE | MATCH-UP STATUS INFO ||||||
|---|---|---|---|---|---|---|---|
| | | GAME ELEMENT STATUS INFO |||||| 
| | | CHARACTER STATUS INFO |||| BALL STATUS INFO |||
| | | CHARACTER ID | LOCATION | MOVING DIRECTION | MOVING SPEED | LOCATION | MOVING DIRECTION | MOVING SPEED |
| u001 | 1 | c001 | (125, 325) | 30° | 25 | (127, 322) | 27° | 45 |
| | | c002 | (049, 276) | 50° | 15 | | | |
| | | c003 | (225, 121) | 10° | 0 | | | |
| | | ⋮ | ⋮ | ⋮ | ⋮ | | | |
| u002 | 3 | c101 | (135, 344) | 30° | 11 | | | |
| | | c102 | (349, 268) | 180° | 20 | | | |
| | | c103 | (395, 101) | 170° | 23 | | | |
| | | ⋮ | ⋮ | ⋮ | ⋮ | | | |

DT3

GAME SYSTEM, TERMINAL APPARATUS, AND RECORDING MEDIUM

CROSS REFERENCE TO RELATED APPLICATIONS

This application is a continuation application of PCT Application No. PCT/JP2018/036413, filed Sep. 28, 2018, and is based on, and claims priority from, Japanese Patent Application No. 2018-027410, filed Feb. 19, 2018, the entire contents of each of which are incorporated herein by reference.

BACKGROUND OF THE INVENTION

Field of the Invention

The present invention relates to a game system, to a terminal apparatus, and to a computer-readable recording medium storing a program.

BACKGROUND OF THE INVENTION

Field of the Invention

Conventionally, there are known games in which users participate using respective game terminals. Known as such a game is one in which users send messages to each other and enjoy chatting during the game. For example, Japanese Patent Application Laid-Open Publication No. 2014-144369 describes a game system in which, in a case in which one of game terminals serves as a server and the other game terminals serve as clients, the game terminal serving as the server acquires, from the game terminals serving as the clients, operation information indicative of a result of an operation performed by each user who operates a client game terminal and the game terminal serving as the server updates status information indicative of a status of the game. In this game system, the game terminal serving as the server transmits updated status information to the game terminals serving as the clients and have the status information be consistent among the game terminals. In this game system, each of the game terminals realizes a chat during a game by transmitting a message input by the user to other game terminals.

In the technique described in Japanese Patent Application Laid-Open Publication No. 2014-144369, operation information and status information are repeatedly transmitted and received among the game terminals so as to have the status information be consistent among the game terminals. Therefore, the communication load on the network is increased. Accordingly, there can be considered reducing the communication load on the network by having game terminals perform common game processing and update the status information in each of the game terminals, without repeatedly transmitting and receiving information among the game terminals as in Japanese Patent Application Laid-Open Publication No. 2014-144369.

However, in this case, disagreement in progress of the game among the game terminals may sometimes occur because processing statuses of the game terminals are different from each other due to factors such as differences in performance among the game terminals. For example, in a case in which a game terminal operated by a first user has a higher performance than one operated by a second user, the game in the game terminal operated by the first user may more rapidly advance than that in the game terminal operated by the second user. In this case, immediately outputting, at the game terminal operated by the second user, a message input by the first user, may facilitate the second user anticipating future development of the game on the basis of the content of the message. As a result, there is a possibility that there will be a diminution in level of amusement in the game for the second user.

SUMMARY

The present invention has been achieved in view of the problems described above, and an object thereof is to provide a technique that enables prevention of diminution in the level of amusement of a game.

In order to solve the above problems, a non-transitory computer-readable recording medium according to one aspect of the present invention has recorded therein a program that causes a processor of a terminal apparatus to function as: a game progressor configured to progress a game based on content information that prescribes progression contents of the game; a first acquirer configured to acquire first progression information indicative of a degree of progress of the game in the terminal apparatus; a second acquirer configured to acquire input information that was input at another terminal apparatus that progresses the game based on the content information, and second progression information indicative of a degree of progress of the game in the other terminal apparatus as of a point in time when the input information was input at the other terminal apparatus; and an output controller configured to control output of output information that corresponds to the input information acquired by the second acquirer based on the first progression information and the second progression information.

A terminal apparatus according to one aspect of the present invention is capable of progressing a game, the terminal apparatus including: a memory storing machine instructions; and at least one processor that implements the machine instructions to execute a method of: progressing the game based on content information that prescribes progression contents of the game; acquiring first progression information indicative of a degree of progress of the game in the terminal apparatus; acquiring input information that was input at another terminal apparatus that progresses the game based on the content information, and second progression information indicative of a degree of progress of the game in the other terminal apparatus as of a point in time when the input information was input at the other terminal apparatus; and controlling output of output information that corresponds to the input information based on the first progression information and the second progression information.

A game system according to one aspect of the present invention includes a plurality of terminal apparatuses each being capable of progressing a game, the game system including: a first game progressor configured to progress the game in a first terminal apparatus among the plurality of terminal apparatuses based on content information that prescribes progression contents of the game; a second game progressor configured to progress the game in a second terminal apparatus among the plurality of terminal apparatuses, based on the content information; a first acquirer configured to acquire first progression information indicative of a degree of progress of the game in the first terminal apparatus; a second acquirer configured to acquire input information that was input at the second terminal apparatus, and second progression information indicative of a degree of progress of the game in the second terminal apparatus as of a point in time when the input information was input at the second terminal apparatus; and an output controller configured to control output of output information that corresponds to the input information acquired by the second acquirer to an output unit associated with the first terminal apparatus, based on the first progression information and the second progression information.

BRIEF DESCRIPTION OF THE DRAWINGS

FIG. 8 is a diagram illustrating an example of a data configuration of user information DT1;

FIG. 9 is a diagram illustrating an example of a data configuration of match-up status information DT3;

DESCRIPTION OF THE EMBODIMENTS

Figure 1:
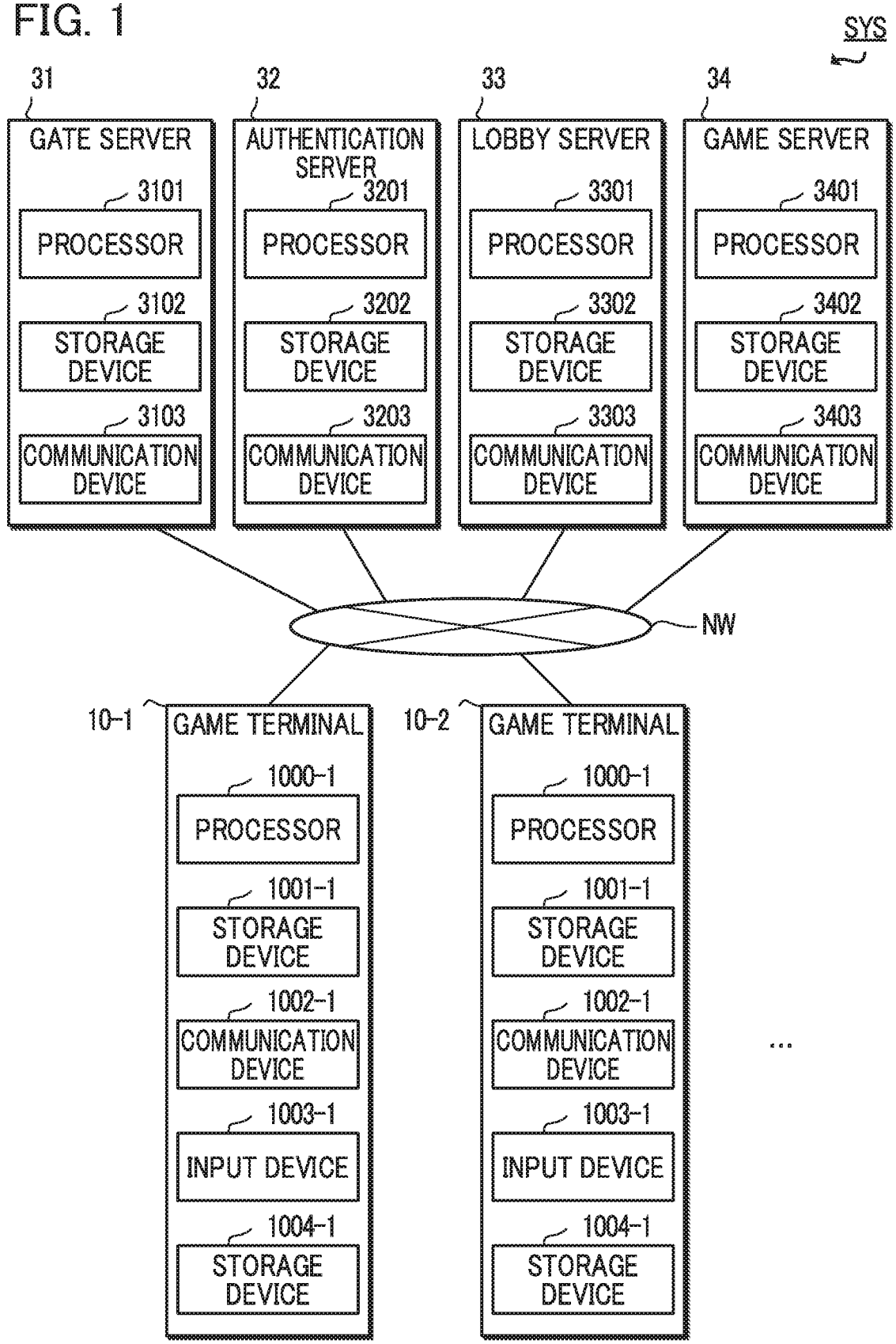
FIG. 1 is an explanatory diagram illustrating an example of an outline of a game system SYS according to an embodiment of the present invention.

Preferred embodiments for carrying out the present invention are explained below with reference to the drawings. In the drawings, the dimensions and scales of elements may be different from those of actual configurations, as appropriate. The embodiments described below are preferred specific examples of the present invention. Therefore, various technically preferable limitations are included in the embodiments. However, the scope of the present invention is not limited to the embodiments unless otherwise described to specifically limit the present invention.

1. Embodiment

Embodiments of the present invention are described below.

1-1. General Configuration of Game System

FIG. 1 is a diagram illustrating a general configuration of a game system SYS according to the present embodiment. As illustrated in FIG. 1, the game system SYS according to the present embodiment includes game terminals 10-1 to 10-M in which a soccer game (an example of game") can be performed, a gate server 31, an authentication server 32, a lobby server 33, and a game server 34 (M is a natural number equal to or greater than 2). An mth game terminal 10 among the game terminals 10-1 to 10-M is hereinafter referred to as "game terminal 10-$m$" in some cases (m is a natural number satisfying 1≤m≤M). Among elements associated with the game system SYS, ones corresponding to the game terminal 10-$m$ are hereinafter represented with a suffix "m" in some cases. In a case in which the game terminals 10-1 to 10-M need not be distinguished from each other, the elements corresponding to the game terminal 10-$m$ among the elements associated with the game system SYS are hereinafter represented without the suffix "m" in some cases. For example, when the game terminals 10-1 to 10-M need not be distinguished from each other, the game terminal 10-$m$ is represented as "game terminal 10" in some cases. In the present embodiment, the game terminal 10-$m$, the gate server 31, the authentication server 32, the lobby server 33, and the game server 34 are connected to a network NW, such as the Internet.

In the present embodiment, an example is given of a case assuming that the game terminals 10 are household game devices. However, any information processor may be adopted as the game terminals 10. For example, the game terminals 10 may be a mobile device, such as a smartphone, a mobile phone, a portable game machine, or a tablet computer, a personal computer, a professional game machine, or a smart television provided with an information processing function.

As illustrated in FIG. 1, the game terminal 10-$m$ includes a processor 1000-$m$ that controls components of the game terminal 10-$m$, a storage device 1001-$m$ that has stored therein various types of information, a communication device 1002-$m$ for performing communication with external devices existing outside the game terminal 10-$m$, an input device 1003-$m$ that receives operations by a user U-m of the game terminal 10-$m$, and a display device 1004-$m$ that displays various types of information.

The storage device 1001 is a non-transitory storage medium and includes, for example, a volatile memory such as a RAM (Random Access Memory) that functions as a work area of the processor 1000 and a non-volatile memory such as an EEPROM (Electrically Erasable Programmable Read-Only Memory) that has stored therein various types of information such as a control program PGt of the game terminal 10. The processor 1000 is a CPU (Central Processing Unit), for example. However, the processor 1000 may be configured to include hardware, such as a GPU (Graphics Processing Unit), a DSP (Digital Signal Processor), or an FPGA (Field Programmable Gate Array) in addition to, or in place of, the CPU. The communication device 1002 is hardware for communication with external devices existing outside the game terminal 10 via one or both of a wired network and a wireless network.

The input device 1003 is, for example, configured to include some or all of an operation button, a keyboard, a mouse, a touch panel, and any other pointing device, and a joystick, and the like, and receives operations performed by the user U of the game terminal 10. The input device 1003 may include, for example, either a microphone for the user U to input information by speaking or a camera for the user U to input information with gestures, or both. The display device 1004 is, for example, a liquid crystal display panel or an organic EL (Electroluminescent) display and displays various images. The input device 1003 and the display device 1004 may be external devices provided outside the game terminal 10 in a form communicable with the game terminal 10.

The gate server 31 includes a processor 3101 that controls components of the gate server 31, a storage device 3102 that has stored therein various types of information, and a communication device 3103 that is hardware for performing communication with external devices existing outside the gate server 31. The storage device 3102 is a non-transitory storage medium and functions as a work area of the processor 3101 as well as having stored therein various types of information such as a control program PGs1 of the gate server 31. The processor 3101 is configured, for example, to include some or all of a CPU, a GPU, a DSP, and an FPGA. The gate server 31 manages, for example, information, such as a server name, an IP address, and the like of each of the authentication server 32, the lobby server 33, and the game server 34.

The authentication server 32 includes a processor 3201 that controls components of the authentication server 32, a storage device 3202 that has stored therein various types of information, and a communication device 3203 that is hardware for performing communication with external devices existing outside the authentication server 32. The storage device 3202 is a non-transitory storage medium and functions as a work area of the processor 3201 as well as having stored therein various types of information such as a control program PGs2 of the authentication server 32. The processor 3201 is configured, for example, to include some or all of a CPU, a GPU, a DSP, and an FPGA. The authentication server 32 authenticates a user U, for example, when the user U operating the game terminal 10 intends to start a soccer game.

The lobby server 33 includes a processor 3301 that controls components of the lobby server 33, a storage device 3302 that has stored therein various types of information, and a communication device 3303 that is hardware for performing communication with external devices existing outside the lobby server 33. The storage device 3302 is a non-transitory storage medium and functions as a work area of the processor 3301 as well as having stored therein various types of information such as a control program PGs3 of the lobby server 33. The processor 3301 is configured, for example, to include some or all of a CPU, a GPU, a DSP, and an FPGA. The lobby server 33 performs, for example, matching that is processing performed when one user U among users U-1 to U-M wishes a match-up for a soccer game with another user U, to select user U to be matched with the one user U.

The game server 34 includes a processor 3401 that controls components of the game server 34, a storage device 3402 that has stored therein various types of information, and a communication device 3403 that is hardware for performing communication with external devices existing outside the game server 34. The storage device 3402 is a non-transitory storage medium and functions as a work area of the processor 3401 as well as having stored therein various types of information such as a control program PGs4 of the game server 34. The processor 3401 is configured, for example, to include some or all of a CPU, a GPU, a DSP, and an FPGA. The game server 34 provides information related to a soccer game to one game terminal 10 operated by one user U and another game terminal 10 operated by another user U when the one user U plays against the other user U in the soccer game.

The game system SYS illustrated in FIG. 1 is merely an example, and the game system SYS may include two or more gate servers 31, two or more authentication servers 32, two or more lobby servers 33, and two or more game servers 34. Alternatively, the game system SYS may include, instead of some or all of the gate server 31, the authentication server 32, the lobby server 33, and the game server 34, one or a plurality of servers 30 that can realize functions realized by some or all of the gate server 31, the authentication server 32, the lobby server 33, and the game server 34.

1-2. Outline of Game

A soccer game according to the present embodiment is explained below with reference to FIGS. 2 to 6.

In the present embodiment, one user U operating one game terminal 10 and another user U operating another game terminal 10 can be matched up in a soccer game. In this example, match-up for a soccer game means playing a soccer match for a soccer game. However, the present invention is not limited to this form, and the soccer game can be a game in which one user U and another user U aim to accomplish a mission while cooperating with each other. Accomplishing a mission in a soccer game may be a victory in a soccer match for the soccer game or may be building and nurturing of a soccer team (hereinafter, also "team") for playing a soccer match for the soccer game. Cooperation with each other of one user U and another user U in the soccer game may be aiming for a victory in a soccer match played by the one user U and the another user U on the same team in the soccer game.

A soccer game is explained below for a case in which a user U-1 of a game terminal 10-1 (an example of "terminal apparatus") and a user U-2 of a game terminal 10-2 (an example of "another terminal apparatus") play against each other in a soccer game, with reference to various screens displayed on the display device 1004-1 of the game terminal 10-1, illustrated as an example. When the user U-1 performs a predetermined start operation to start an application of a soccer game using the input device 1003-1 of the game terminal 10-1, a menu screen G1 is displayed on the display device 1004-1 of the game terminal 10-1.

Figure 2:
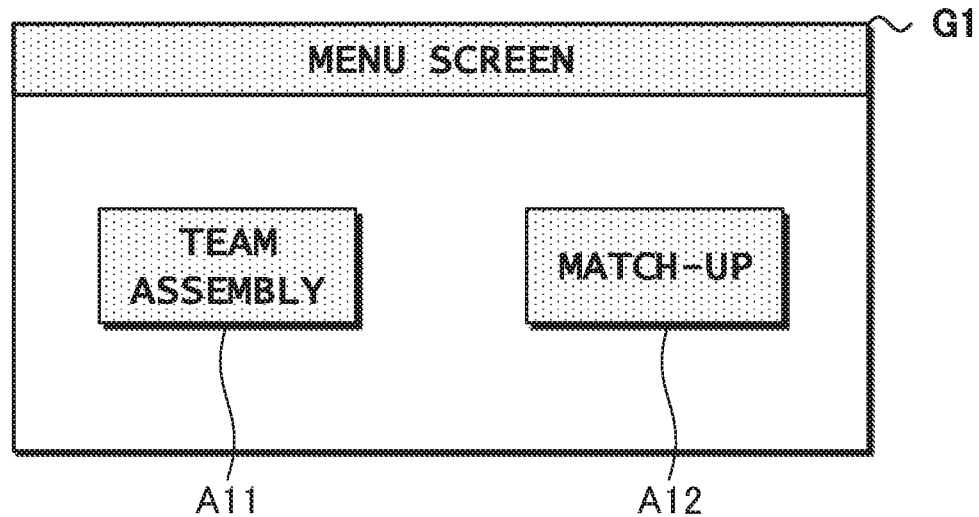
FIG. 2 is an explanatory diagram illustrating an example of a menu screen G1.

FIG. 2 is a diagram illustrating an example of the menu screen G1. As illustrated in FIG. 2, the menu screen G1 includes a team assembly button A11 for displaying a team assembly screen (not shown), and a match-up button A12 for starting match-up. In the present embodiment, each user U owns characters C that can be used in match-up of a soccer game. The characters C are, for example, soccer players in the soccer game. In the present embodiment, each user U can select characters C constituting a team to be used in match-up from among the characters C owned by the user U by operating the input device 1003-1 of the game terminal 10-1 on the team assembly screen. Furthermore, in the present embodiment, each user U can make the team consisting of the selected characters C play against a team consisting of characters C selected by another user U.

Figure 3:
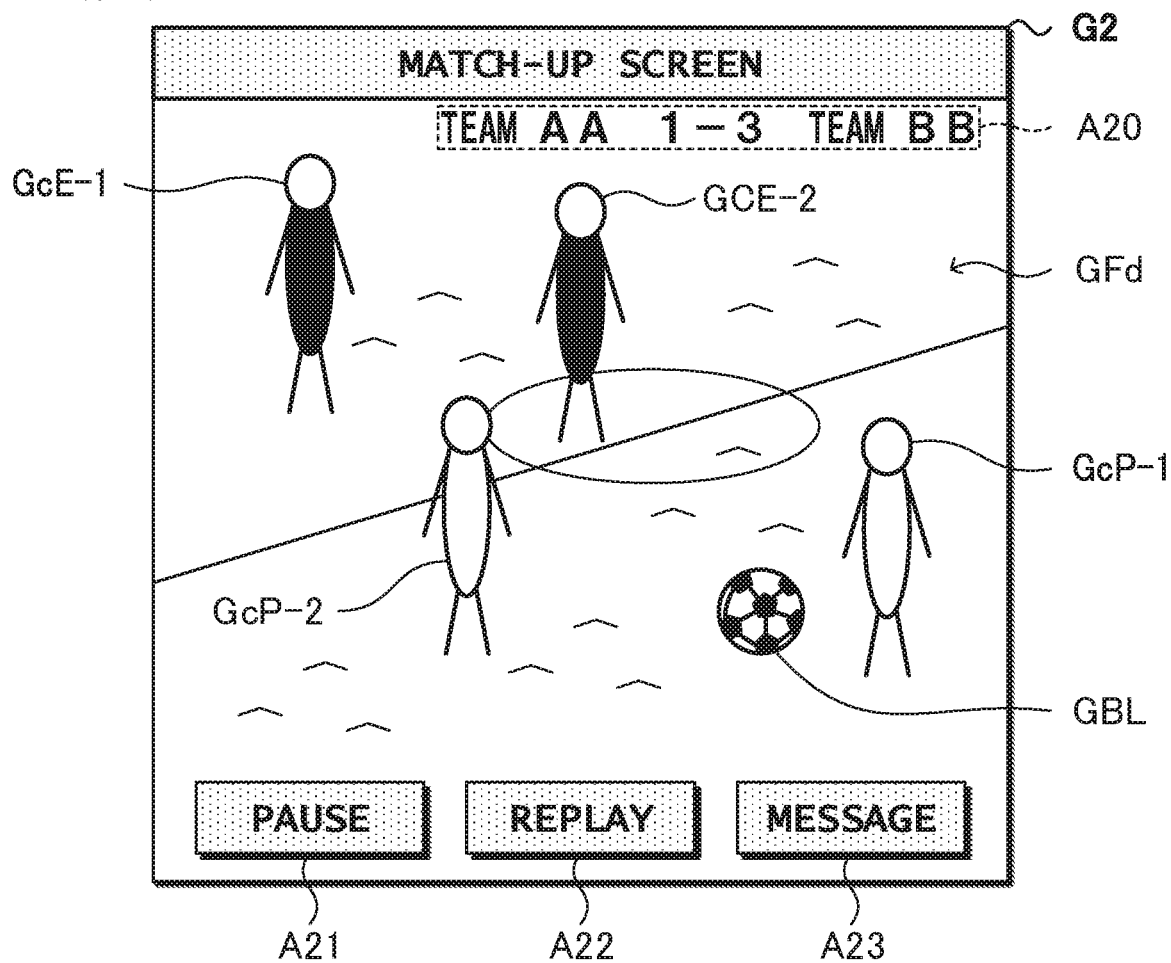
FIG. 3 is an explanatory diagram illustrating an example of a match-up screen G2.

When the user U-1 selects the match-up button A12 on the menu screen G1 using the input device 1003-1 of the game terminal 10-1, a match-up screen G2 is displayed on the display device 1004-1 of the game terminal 10-1 and the match-up is started. FIG. 3 is a diagram illustrating an example of the match-up screen G2. The match-up screen G2 is a screen showing the team of the user U-1 playing soccer against the team of the user U-2 in a virtual field Fd. As illustrated in FIG. 3, the match-up screen G2 includes a field image GFd indicative of the field Fd, a ball image GBL indicative of a soccer ball, character images GcP indicative of the characters C constituting the team of the user U-1, and opponent character images GcE indicative of the characters C constituting the team of the user U-2 as the opponent. The match-up screen G2 also includes a score display area A20 displaying a name of the team of the user U-1, a name of the team of the user U-2, a score gained by the team of the user U-1, and a score gained by the team of the user U-2.

As illustrated in FIG. 3, the match-up screen G2 also includes a pause button A21 for pausing the match-up, a replay button A22 for displaying a replayed video of the match-up, and a message button A23 for inputting a message to be transmitted to the user U-2 who is the opponent. In the present embodiment, a replayed video is a video of a past scene in the match-up displayed again on the match-up screen G2.

In the soccer game according to the present embodiment, a case is assumed in which match-up for a soccer game progresses independently of operations performed by the user U on the input device 1003. In other words, in the present embodiment, a case is assumed in which match-up for a soccer game automatically progresses, controlled by the game system SYS. That is, in the present embodiment, respective actions of the characters C of each team are not determined in accordance with a result of a user U's operation on the input device 1003 but the match-up progresses with actions of the characters C of each team on the basis of determination by the game system SYS. After the application of the soccer game is activated and before match-up for a soccer game is started, the game system SYS performs match-up preparation processing to start the match-up for the soccer game in the present embodiment, which will be described in detail later. In the present embodiment, the game terminal 10 starts the match-up for the soccer game after the match-up preparation processing ends. That is, in the present embodiment, after the match-up preparation processing ends, the game terminal 10 performs match-up progression processing that is processing for progressing the match-up for the soccer game. In other words, in the present embodiment, the match-up for the soccer game does not progress while the match-up preparation processing is being performed, and the match-up for the soccer game progresses while the match-up progression processing is being performed after the match-up preparation processing ends. In the present embodiment, progression of match-up for a soccer game is an example of "progression of a game".

In the soccer game according to the present embodiment, when match-up is performed between the user U-1 of the game terminal 10-1 and the user U-2 of the game terminal 10-2, each of the game terminal 10-1 and the game terminal 10-2 individually progresses the match-up of the same contents. That is, in the present embodiment, when match-up is performed between the user U-1 of the game terminal 10-1 and the user U-2 of the game terminal 10-2, the game terminal 10-1 and the game terminal 10-2 do not share information related to progression contents of the match-up. In the present embodiment, information related to progression contents of match-up is a concept including information defining the progression contents of the match-up and information for adjusting the progression speed of the match-up among game terminals 10. The progression contents of match-up are an example of "progression contents of a game". When match-up is performed between the user U-1 of the game terminal 10-1 and the user U-2 of the game terminal 10-2, game content information DT0 (an example of "content information") being information that prescribes the progression contents of the match-up for the soccer game is supplied from the game server 34 to the game terminal 10-1 and the game terminal 10-2, which will be described later in detail. Each of the game terminal 10-1 and the game terminal 10-2 progresses the match-up on the basis of the game content information DT0. Therefore, according to the present embodiment, each of the game terminal 10-1 and the game terminal 10-2 can individually progress the match-up of same contents determined on the basis of the game content information DT0.

In the present embodiment, the information (hereinafter, also "progression content prescriptive information") that prescribes the progression contents of match-up is information (hereinafter, "determination method prescriptive information") that prescribes a determination method used when a game terminal 10-m determines progression contents of match-up for a soccer game. However, the present invention is not limited to this form. The progression content prescriptive information may be, for example, information (hereinafter, "progression content designation information") that designates progression contents themselves of match-up for a soccer game. That is, although a case is assumed in which the game content information DT0 is determination method prescriptive information in the present embodiment, the game content information DT0 may be progression content designation information.

The progression content designation information may be information that represents the progression contents themselves of match-up for a soccer game. Alternatively, the progression content designation information may be information that represents determined contents in a case in which the game terminal 10 determines the progression contents of match-up for a soccer game. The progression content designation information may alternatively be information that represents already determined progression contents of match-up in a case in which the progression contents of the match-up for the soccer game are already determined. The progression content designation information may be information (for example, "update content designation information", which will be described later) that designates update contents of information indicative of a progress status of match-up for the soccer game in a case in which the game terminal 10 progresses the match-up for the soccer game by updating information (for example, "match-up status information DT3", which will be described later) that indicates the progress status of the match-up for the soccer game.

The determination method prescriptive information may be information that prescribes a method for generating update content designation information that designates update contents of information indicative of the progress status of match-up of the soccer game in a case in which the game terminal 10 progresses the match-up for the soccer game by updating information indicative of the progress status of the match-up for the soccer game. Specifically, the determination method prescriptive information may be, for example, information that indicates a rule or a function (for example, "designation value generation rule") for generating the update content designation information in the game terminal 10. For example, in a case in which the designation value generation rule is a function that outputs update content designation information that indicates a value depending on an input value input to the designation value generation rule, the determination method prescriptive information may be information that indicates the input value of the function.

Figure 4:
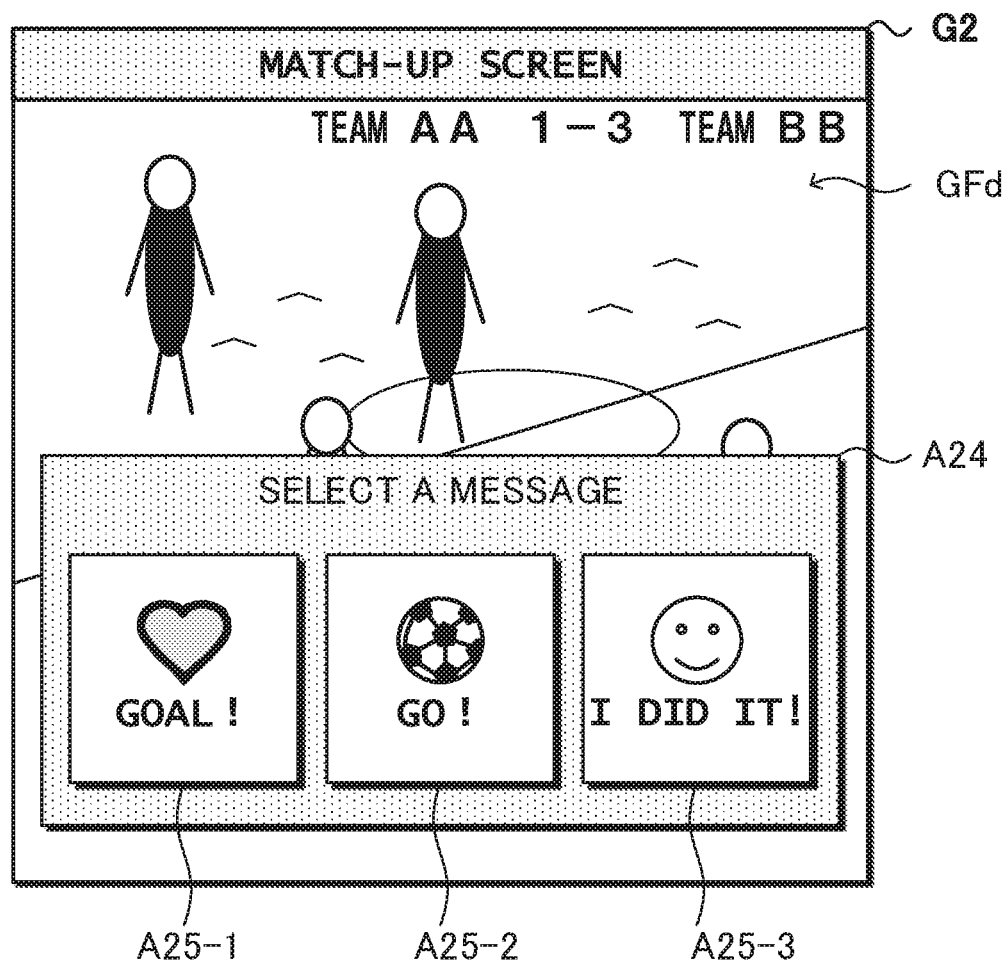
FIG. 4 is an explanatory diagram illustrating an example of the match-up screen G2.

When the message button A23 is selected on the match-up screen G2, a message input window A24 for inputting a message is displayed on the match-up screen G2. FIG. 4 is a diagram illustrating an example of the message input window A24. In the present embodiment, a message can be input with use of an image called "stamp". As illustrated in FIG. 4, multiple stamps A25 are displayed in the message input window A24 as a list. In the present embodiment, a case in which each of the stamps A25 includes an image of the face of a character, a soccer ball, or the like, and text (e.g., a string of letters (and/or characters)) indicating contents of the message is assumed as an example. When the user U-1 selects one of stamps A25-1 to A25-3 displayed in the message input window A24, the selected stamp A25 is input as a message. The input message is displayed on the match-up screen G2 displayed on the game terminal 10-1 and the match-up screen G2 displayed on the game terminal 10-2.

Figure 5:
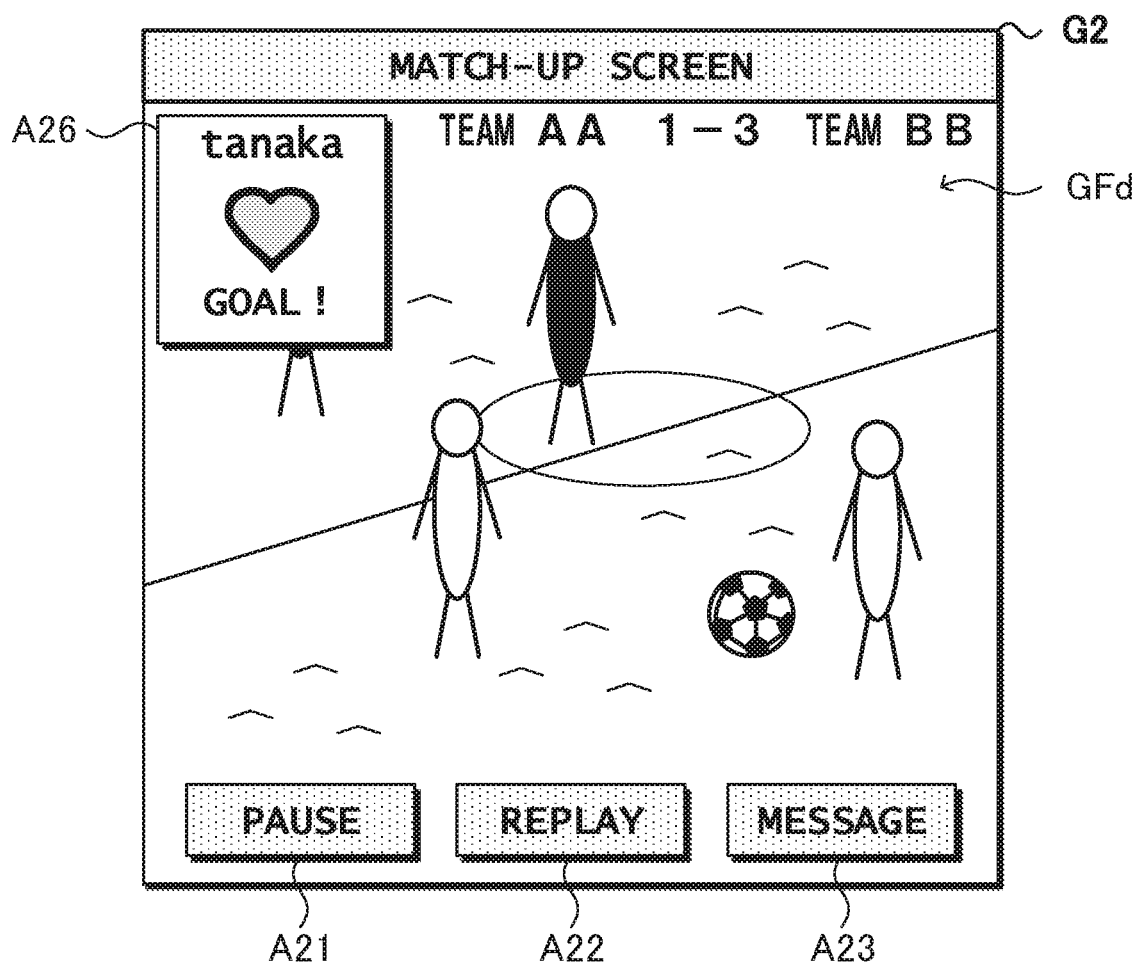
FIG. 5 is an explanatory diagram illustrating an example of the match-up screen G2.

FIG. 5 is a diagram illustrating a manner in which a message A26 corresponding to the stamp A25 selected by the user U-1 is displayed on the match-up screen G2. As illustrated in FIG. 5, the message A26 includes, for example, the image and the text included in the stamp A25, and the name of the user U-1 that has selected the stamp A25.

As described above, each of the game terminal 10-1 and the game terminal 10-2 individually progresses the match-up of the same contents in the present embodiment. Therefore, disagreement is likely to occur between the progression speed of the match-up in the game terminal 10-1 and the progression speed of the match-up in the game terminal 10-2 due to a difference in the processing status between the game terminal 10-1 and the game terminal 10-2. For example, when the game terminal 10-1 has a higher processing performance than the game terminal 10-2, the progress of the match-up in the game terminal 10-1 may be faster than that of the match-up in the game terminal 10-2. Therefore, for example, in a case in which the progression speed of the match-up is faster in the game terminal 10-1 than in the game terminal 10-2, and the message A26 corresponding to the stamp A25 input by the user U-1 on the game terminal 10-1 is displayed on the display device 1004-2 of the game terminal 10-2 immediately after input of the stamp A25 by the user U-1, the user U-2 can predict future development of the game depending on contents of the message A26 displayed on the display device 1004-2. This will detract from the level of amusement of the game for the user U2, which is undesirable. To avoid such an inconvenience, the present embodiment adjusts the timing at which the message A26 corresponding to the stamp A25 input by the user U-1 on the game terminal 10-1 is displayed on the display device 1004-2 of the game terminal 10-2.

Figure 6:
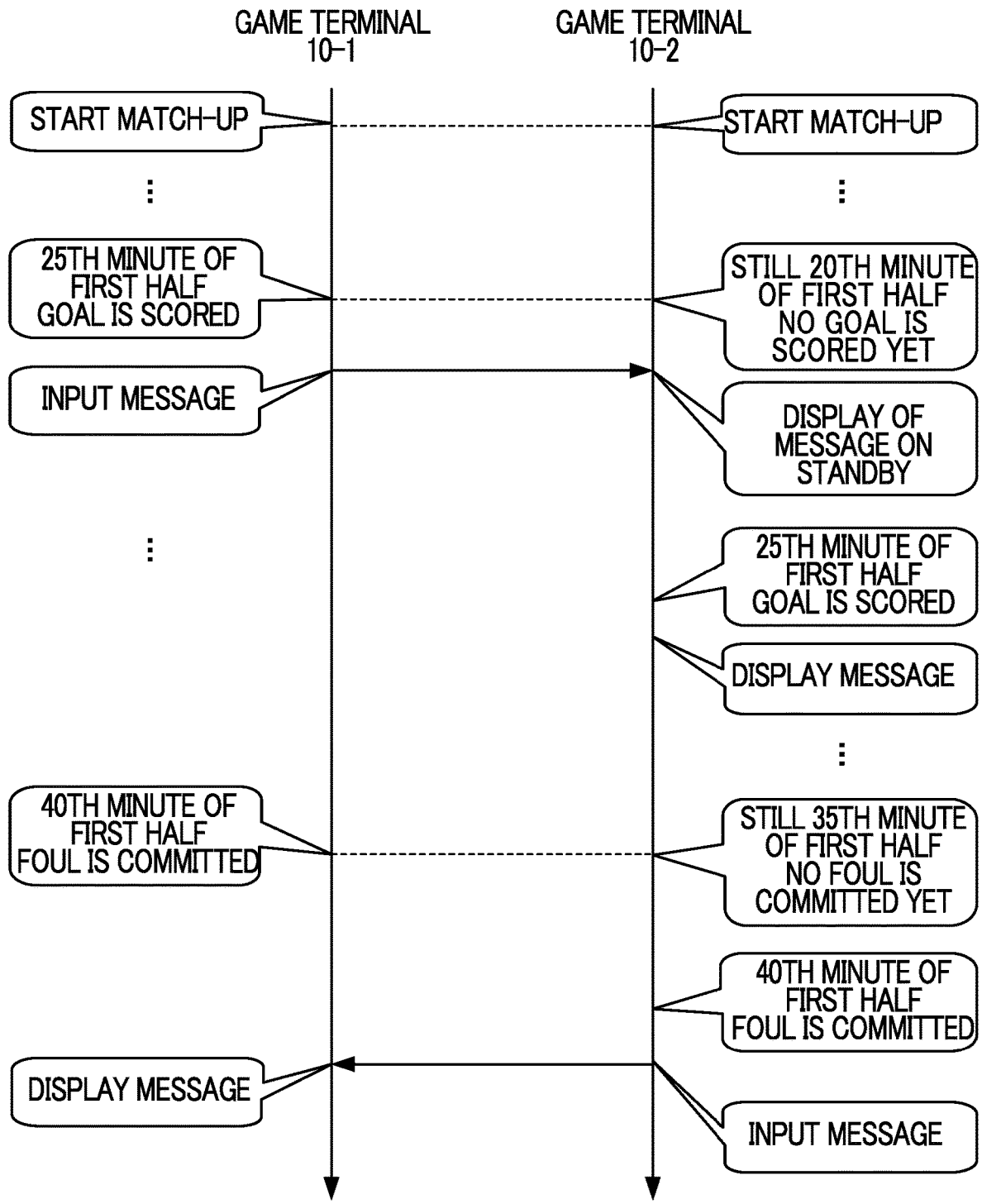
FIG. 6 is an explanatory diagram illustrating an example of an outline of match-up.

FIG. 6 is an explanatory diagram for explaining an example of an input timing and an output timing of a message A26. In FIG. 6, there is assumed a case in which the progression speed of match-up for a soccer game of the game terminal 10-1 is faster than that of the game terminal 10-2. It is further assumed in FIG. 6 is a case in which the game terminal 10-1 and the game terminal 10-2 start match-up for the soccer game at the same time.

In the example illustrated in FIG. 6, a case is assumed in which a goal is scored at a timing when a virtual time of 25 minutes has elapsed (hereinafter, "virtual elapsed time") from start of the match-up for the soccer game. In this case, the display device 1004-1 of the game terminal 10-1 displays a scene of the goal at an earlier timing than the display device 1004-2 of the game terminal 10-2. In a case in which a message A26 about the goal, which is input by the user U-1 through the game terminal 10-1 at the timing when the goal is scored, is displayed on the display device 1004-2 of the game terminal 10-2 immediately after input of the message A26, the message A26 about the goal is displayed on the display device 1004-2 before the scene of the goal is displayed on the display device 1004-2 of the game terminal 10-2. In this case, the user U-2 can predict scoring of the goal before the scene of the goal is displayed on the display device 1004-2 of the game terminal 10-2, which may spoil the excitement. Accordingly, in the present embodiment, display of the message A26 about the goal on the display device 1004-2, which is input by the user U-1 through the game terminal 10-1, is held on standby until the virtual elapsed time in the game terminal 10-2 reaches "25 minutes" and then the scene of the goal is displayed on the display device 1004-2 of the game terminal 10-2.

On the other hand, there is assumed a case in which a foul is committed at a timing when the virtual elapsed time is 40 minutes and in which the user U-2 inputs a message A26 about the foul through the game terminal 10-2 in the example illustrated in FIG. 6. In this case, the scene of the foul is displayed on the game terminal 10-1 before a timing when the scene of the foul is displayed on the game terminal 10-2. Therefore, in this case, the game terminal 10-1 displays the message A26 about the foul, which is input by the user U-2 through the game terminal 10-2, on the display device 1004-1 without keeping the message A26 on standby.

In this way, in the game system SYS according to the present embodiment, until a progression stage in match-up in one game terminal 10 catches up with a progression stage in the match-up in another game terminal 10, the game system SYS prohibits a message A26 that is input by the other game terminal 10 from being output at the one game terminal 10. Therefore, the present embodiment can prevent a user U from predicting future developments in the game on the basis of contents of the message A26.

1-3. Functions Realized by Game System

Functions related to the present invention among functions realized by the game system SYS are explained below with reference to FIGS. 7 to 13.

1-3-1. Functions Realized by Game Terminal

Figure 7:
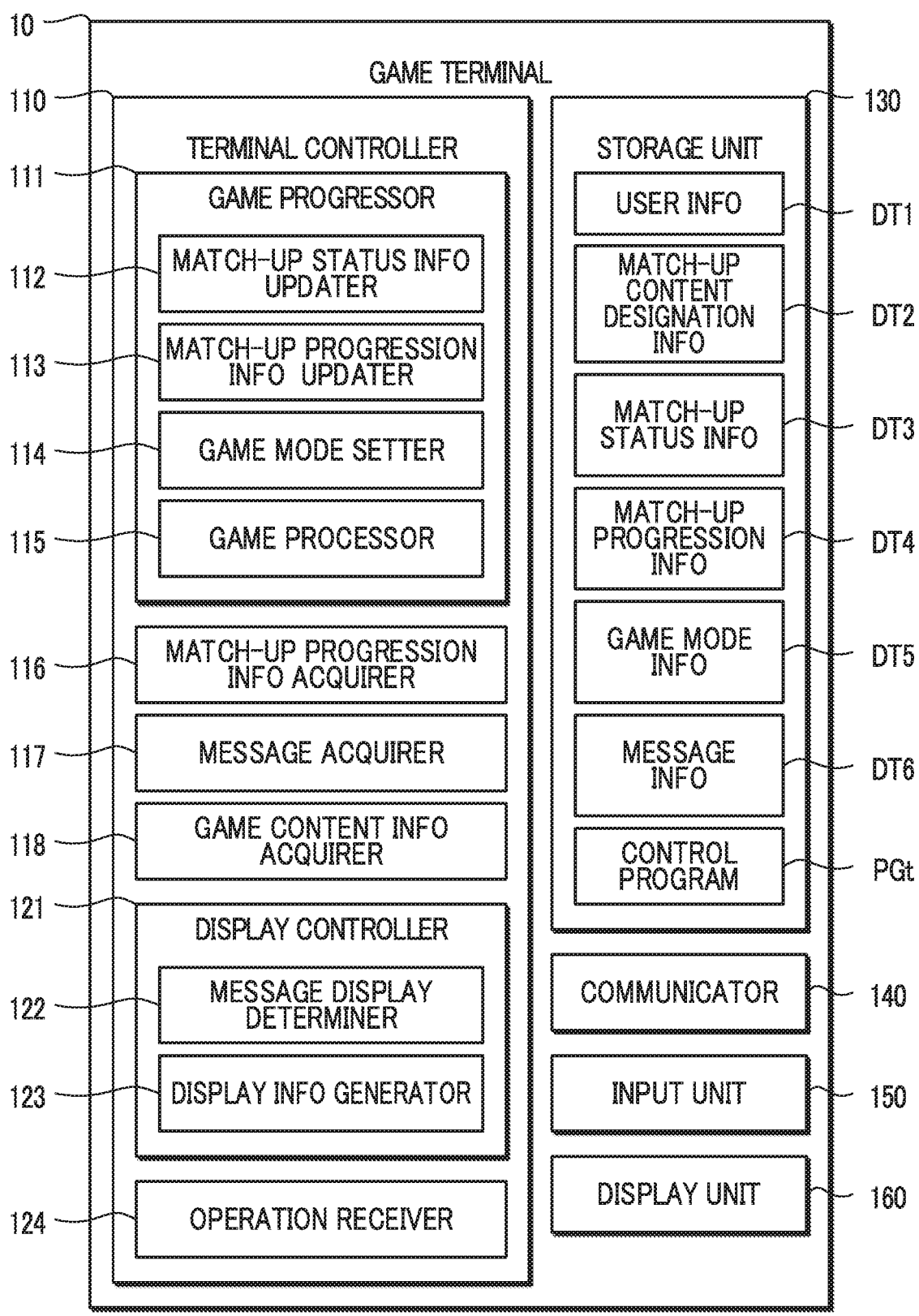
FIG. 7 is a block diagram illustrating an example of a configuration of a game terminal 10.

FIG. 7 is a functional block diagram illustrating an example of a functional configuration of the game terminal 10. As illustrated in FIG. 7, the game terminal 10 includes a terminal controller 110 that controls components of the game terminal 10, a storage unit 130 that has stored therein various types of information, a communicator 140 for performing communication with external devices existing outside the game terminal 10, an input unit 150 for receiving operations by a user U of the game terminal 10, and a display unit 160 capable of displaying various images. Among these components, the terminal controller 110 is a function realized by the processor 1000, by executing a control program PGt (an example of "program") stored in the storage device 1101 and operating in accordance with the control program PGt. The storage unit 130 is a function provided by the storage device 1001. The communicator 140 is a function provided by the communication device 1002. The input unit 150 is a function provided by the input device 1003. The display unit 160 is a function provided by the display device 1004.

As illustrated in FIG. 7, the storage unit 130 has stored therein user information DT1 being information associated with the user U participating in match-up for a soccer game, match-up content designation information DT2 being information that designates progression contents of the match-up, match-up status information DT3 indicating the status of the match-up, match-up progression information DT4 indicating the degree of progression in the match-up, game mode information DT5 indicating whether the match-up is progressing, message information DT6 being information on a message A26 displayed on the match-up screen G2, and the control program PGt. The game content information DT0 described above is information including the user information DT1 and the match-up content designation information DT2. That is, the user information DT1 and the match-up content designation information DT2 in the present embodiment are information that is generated in the game server 34 when match-up is to be started in the game terminal 10, and that are supplied from the game server 34 to the game terminal 10.

FIG. 8 is a diagram illustrating an example of a data configuration of the user information DT1. Illustrated in FIG. 8 are the user information DT1 stored in the storage unit 130 of the game terminal 10-1 and the storage unit 130 of the game terminal 10-2 in a case in which the user U-1 operating the game terminal 10-1 and the user U-2 operating the game terminal 10-2 are matched up in a soccer game. As illustrated in FIG. 8, the user information DT1 is information including, for example, user IDs of the user U-1 and the user U-2, names (user names) of the user U-1 and the user U-2, names (team names) of teams used by the user U-1 and the user U-2 in match-up, and user character information on the characters C constituting the team used by each of the user U-1 and the user U-2 in match-up.

The user ID is information for uniquely identifying each user U among users U-1 to U-M that can play the soccer game. The user character information is information including, for example, a character ID of each character C, a name (character name) of each character C, role information indicative of the role of each character C in match-up, and ability information indicative of the ability of each character C associated with the match-up. The character ID is information for uniquely identifying each character C among characters C appearing in the soccer game. In the present embodiment, the role information is, for example, information indicative of the position that can be played by each character C in match-up of the soccer game. In the present embodiment, the ability information is, for example, information that includes passing ability information indicative of the level of the passing ability of each character C, shooting ability information indicative of the level of the shooting ability of the character C, and dribbling ability information indicative of the level of the dribbling ability of the character C.

The match-up content designation information DT2 is, for example, information that includes seed information indicative of a seed value, described later, and a designation value generation rule information indicative of a designation value generation rule, described later. As described above, the seed information and the designation value generation rule information are information generated in the game server 34 and supplied to the game terminal 10. Although there is assumed a case in which designation value generation rule information is generated in the game server 34 in the present embodiment, the present invention is not limited to this form. The designation value generation rule information may be information stored in advance in the storage unit 130 of the game terminal 10.

The seed information is information having characteristics as the determination method prescriptive information. Specifically, the seed value indicated by the seed information is a value that prescribes a generation method of update content designation information that designates update contents of the match-up status information DT3 indicative of the progress status of match-up in the game terminal 10. In the present embodiment, the seed value indicated by the seed information may be, for example, a random value generated in the game server 34, information indicative of the clock time at which the match-up content designation information DT2 is generated in the game server 34, or a predetermined value. The designation value generation rule indicated by the designation value generation rule information is a function for generating the update content designation information consisting of update content designation values B[1] to B[K] (K is a natural number equal to or greater than 2) on the basis of the seed value. The update content designation value B[k] is information that designates contents of a kth update (k is a natural number meeting 1≤k≤K) of the match-up status information DT3. That is, the designation value generation rule information is information having characteristics as the determination method prescriptive information, and the update content designation information is information having characteristics as the progression content designation information. The value K is set as a value greater than the number of updates of the match-up status information DT3 in match-up for the soccer game.

FIG. 9 is a diagram illustrating an example of a data configuration of the match-up status information DT3. Illustrated in FIG. 9 are the match-up status information DT3 stored in each of the storage unit 130 of the game terminal 10-1 and the storage unit 130 of the game terminal 10-2 in a case in which the user U-1 operating the game terminal 10-1 and the user U-2 operating the game terminal 10-2 are matched up in the soccer game. As illustrated in FIG. 9, the match-up status information DT3 is, for example, information including a user ID of each of the user U-1 and the user U-2, a score gained by each of the user U-1 and the user U-2 in the match-up, and game element status information indicative of the statuses of game elements associated with the match-up.

In the present embodiment, the game elements associated with the match-up are a concept including characters C playing in the match-up and a soccer ball used in the match-up. In the present embodiment, the game element status information includes character status information indicative of the status of each of the characters C participating in the match-up, and ball status information indicative of the status of the soccer ball used in the match-up. The character status information is, for example, information indicative of the character ID of each of the characters C participating in the match-up, and the location on the field Fd, the moving direction, and the moving speed of each of the characters C participating in the match-up. The ball status information is, for example, information indicative of the location on the field Fd, the moving direction, and the moving speed of the soccer ball used in the match-up.

In the present embodiment, the match-up status information DT3 stored in the storage unit 130 of the game terminal 10-1 and the match-up status information DT3 stored in the storage unit 130 of the game terminal 10-2 indicate the same contents at a timing when match-up is started. At the start of match-up, the game content information DT0 supplied to the game terminal 10-1 from the game server 34 and the game content information DT0 supplied to the game terminal 10-2 from the game server 34 indicate the same contents in the present embodiment. That is, in the present embodiment, the update content designation value B[k] generated by the game terminal 10-1 and the update content designation value B[k] generated by the game terminal 10-2 have the same value. Therefore, in the present embodiment, the match-up status information DT3 updated for a kth time in the game terminal 10-1 and the match-up status information DT3 updated for a kth time in the game terminal 10-2 indicate the same contents.

The match-up progression information DT4 is information indicative of the degree of progression of match-up in the game terminal 10 playing in the match-up. Specifically, the match-up progression information DT4 indicates the number GT of updates of the match-up status information DT3 in the game terminal 10. More specifically, when the match-up status information DT3 is updated for the kth time, the number GT of updates is "k". The number GT of updates indicated by the match-up progression information DT4 in the game terminal 10-1 is hereinafter also referred to as "the number GT1 of updates" and the number GT of updates indicated by the match-up progression information DT4 in the game terminal 10-2 is also referred to as "the number GT2 of updates". That is, the match-up progression information DT4 indicating the number GT1 of updates are an example of "first progression information" and the match-up progression information DT4 indicating the number GT2 of updates are an example of "second progression information".

In the present embodiment, the game terminal 10 can perform match-up for a soccer game in two game modes including a match-up progression mode and a match-up suspension mode. The match-up progression mode is a game mode in which the match-up status information DT3 is updated and the status of the match-up progresses. The match-up suspension mode is a game mode in which the match-up status information DT3 is not updated and the status of the match-up does not change.

The game mode information DT5 indicates whether the game mode in the game terminal 10 is in the match-up progression mode or in the match-up suspension mode.

In the present embodiment, when match-up is started in the game terminal 10, the game mode is set to the match-up progression mode. In the present embodiment, when the pause button A21 is selected on the match-up screen G2, the game mode is set to the match-up suspension mode. When the pause button A21 is selected again after the pause button A21 is selected on the match-up screen G2 to set the game mode to the match-up suspension mode in the present embodiment, the game mode is set to the match-up progression mode. In the present embodiment, when the match-up status information DT3 has been updated a predetermined number Khf of times, halftime arrives and the game mode is set to the match-up suspension mode (Khf is a natural number meeting 1≤Khf≤K). When a predetermined time length Thf elapses after the halftime is started and the game mode is set to the match-up suspension mode in the present embodiment, the halftime ends and the game mode is set to the match-up progression mode. A situation in which the match-up status information DT3 has been updated the predetermined number of times Khf and the halftime arrives is an example of "when progress of the game reaches a predetermined stage". In the present embodiment, the halftime ends when the predetermined time length Thf elapses after the halftime is started and the game mode is set to the match-up suspension mode. However, the present invention is not limited to this form. For example, a form in which the halftime ends when the user U of the game terminal 10 performs a predetermined halftime end operation using the input unit 150 may be adopted.

The message information DT6 is information including a message ID for identifying each message among all types of messages that can be input by a user U in a soccer game, message image information indicative of an image included in each message, and message text information indicative of text included in each message. Hereinafter, information that includes information (an example of "input information") indicative of a message input by a user U in the message information DT6 and the match-up progression information DT4 at a timing when the message was input are referred to as "message notification information DTm". While including a message input by a user U in the present embodiment, the message notification information DTm may include a message ID (another example of "input information") that corresponds to the message input by the user U, instead of the message. That is, the message notification information DTm may be information including the message ID and the match-up progression information DT4 only, and without the message image information and the message text information.

As illustrated in FIG. 7, the terminal controller 110 provided in the game terminal 10 includes a game progressor 111, a match-up progression information acquirer 116, a message acquirer 117, a game content information acquirer 118, a display controller 121, and an operation receiver 124.

The game progressor 111 includes a match-up status information updater 112, a match-up progression information updater 113, a game mode setter 114, and a game processor 115 and progresses the soccer game. Among these components, the match-up status information updater 112 progresses match-up for the soccer game by updating the match-up status information DT3 on the basis of the update content designation value B[k]. Processing for updating the match-up status information DT3 is an example of "progression processing". The match-up progression information updater 113 updates the match-up progression information DT4 when the match-up status information updater 112 updates the match-up status information DT3. Specifically, the match-up progression information updater 113 sets the number GT of updates indicated by the match-up progression information DT4 to a value [k] when the match-up status information updater 112 updates the match-up status information DT3 for a kth time after match-up for the soccer game is started. The game mode setter 114 sets a game mode in the game terminal 10 by setting either a value indicative of the match-up progression mode or a value indicative of the match-up suspension mode in the game mode information DT5. The game processor 115 performs the match-up preparation processing that is processing for starting match-up for the soccer game.

The match-up progression information acquirer 116 (an example of "first acquirer") acquires the match-up progression information DT4 from the storage unit 130. The message acquirer 117 (an example of "second acquirer") acquires the message notification information DTm when a game terminal 10 and another game terminal 10 are matched up and the message notification information DTm is transmitted from the other game terminal 10 to the game terminal 10. The message acquirer 117 acquires information related to a message input by a user U when the user U inputs the message by operating the input unit 150 in the game terminal 10. The game content information acquirer 118 (an example of "third acquirer") acquires the game content information DT0 when the game content information DT0 is supplied from the game server 34.

The display controller 121 (an example of "output controller") includes a message display determiner 122 and a display information generator 123 and controls display of various images on the display unit 160.

Among these components, the message display determiner 122 determines whether a message contained in the message notification information DTm received from another game terminal 10 is to be displayed on the display unit 160 when the game terminal 10 and the other game terminal 10 are matched up and the message notification information DTm are transmitted from the other game terminal 10 to the game terminal 10. Specifically, the message display determiner 122 determines whether the message contained in the message notification information DTm received from the other game terminal 10 is to be displayed on the display unit 160 on the basis of the number GT of updates (hereinafter, "the number GT-x of internal updates") indicated by the match-up progression information DT4 acquired by the match-up progression information acquirer 116, and the number GT of updates (hereinafter, "the number GT-y of acquired updates") indicated by the match-up progression information DT4 contained in the message notification information DTm received from the other game terminal 10. The number GT-x of internal updates is the number GT of updates of the match-up status information DT3 in the game terminal 10 at a timing when the message display determiner 122 determines whether to display the message on the display unit 160. The number GT-y of acquired updates is the number GT of updates of the match-up status information DT3 in the other game terminal 10 at a timing when the message is input by the other game terminal 10.

For example, the message display determiner 122 determines that the message contained in the message notification information DTm received from the other game terminal 10 is to be displayed on the display unit 160 when the number GT-x of internal updates is equal to or greater than the number GT-y of acquired updates. On the other hand, when the number GT-x of internal updates is less than the number GT-y of acquired updates, the message display determiner 122 determines to prohibit the message contained in the message notification information DTm received from the other game terminal 10, from being displayed on the display unit 160. The match-up progression information acquirer 116 periodically acquires the match-up progression information DT4 from the storage unit 130 while display of the message received from the other game terminal 10 on the display unit 160 is prohibited. The message display determiner 122 determines to display the message received from the other game terminal 10 on the display unit 160 on the basis of the number GT-x of internal updates last-acquired by the match-up progression information acquirer 116. Accordingly, even if the number GT-x of internal updates is less than the number GT-y of acquired updates and hence display of the message received from the other game terminal 10 on the display unit 160 is prohibited, the message display determiner 122 determines that the message received from the other game terminal 10 is to be displayed on the display unit 160 when the number GT-x of internal updates thereafter reaches the number GT-y of acquired updates. In other words, when the number GT-x of internal updates is less than the number GT-y of acquired updates, the message display determiner 122 keeps display of the message received from the other game terminal 10 on the display unit 160 on standby until a timing when the number GT-x of internal updates becomes equal to or greater than the number GT-y of acquired updates.

The display information generator 123 generates display information (an example of "output information") indicating an image to be displayed on the display unit 160 on the basis of a result of determination by the message display determiner 122. Specifically, when the message display determiner 122 determines to display the message received from the other game terminal 10 on the display unit 160, the display information generator 123 generates display information indicative of an image including the message and causes the image based on the display information to be displayed on the display unit 160. On the other hand, when the message display determiner 122 prohibits the message received from the other game terminal 10 from being displayed on the display unit 160, the display information generator 123 generates display information indicative of an image not including the message and causes the image based on the display information to be displayed on the display unit 160. When the match-up is progressing in the game terminal 10, the display information generator 123 generates display information indicative of the match-up screen G2 on the basis of the match-up status information DT3.

The operation receiver 124 (an example of "receiver") receives contents of an operation when the user U of the game terminal 10 operates the input unit 150.

1-3-2. Functions Realized by Gate Server

Figure 10:
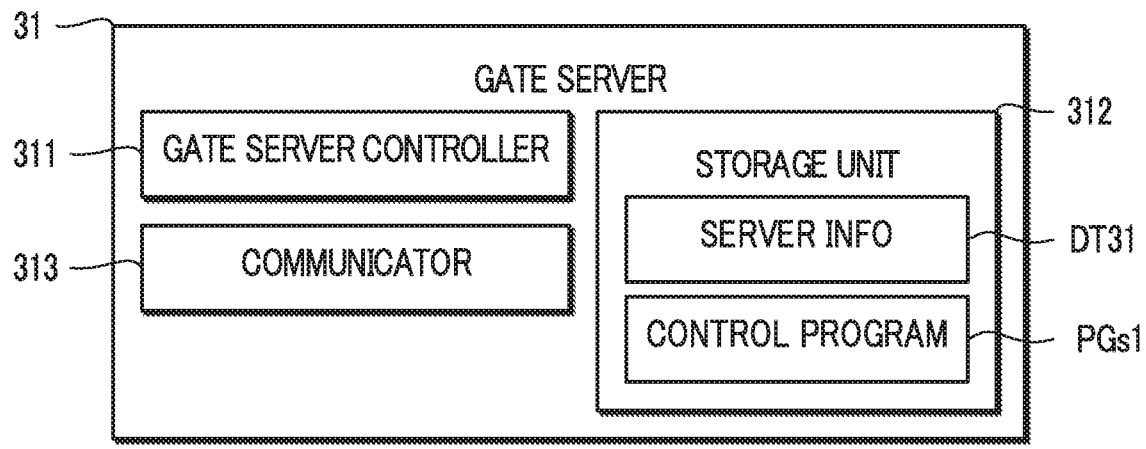
FIG. 10 is a block diagram illustrating an example of a configuration of a gate server 31.

FIG. 10 is a functional block diagram illustrating an example of a functional configuration of the gate server 31. As illustrated in FIG. 10, the gate server 31 includes a gate server controller 311 that controls components of the gate server 31, a storage unit 312 that has stored therein various types of information, and a communicator 313 for performing communication with external devices existing outside the gate server 31. Among these components, the storage unit 312 has stored therein the control program PGs1 of the gate server 31, and server information DT31 indicating server names, IP addresses, and the like of the authentication server 32, the lobby server 33, and the game server 34. The storage unit 312 is a function provided by the storage device 3102. The gate server controller 311 is a function realized by the processor 3101 by executing the control program PGs1 stored in the storage device 3102 and operating in accordance with the control program PGs1. The communicator 313 is a function provided by the communication device 3103.

1-3-3. Functions Realized by Authentication Server

Figure 11:
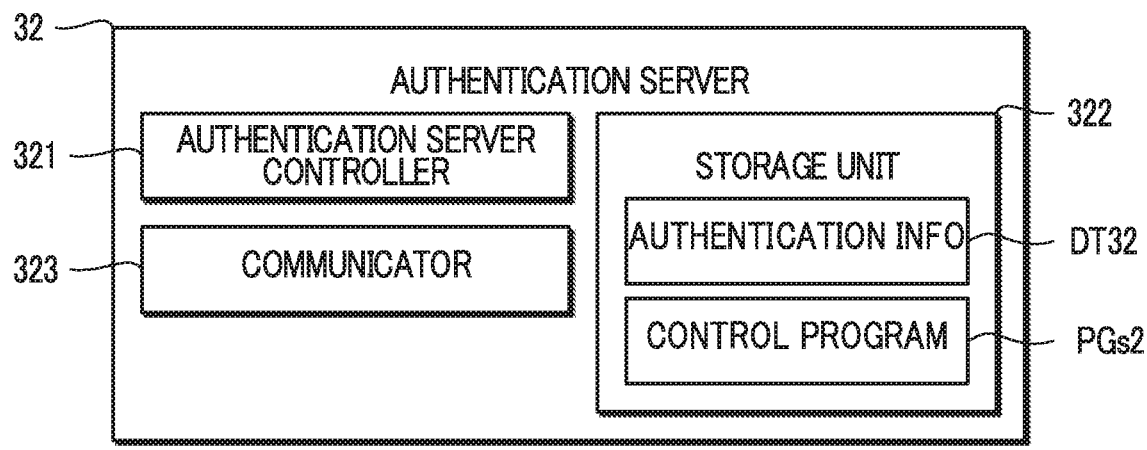
FIG. 11 is a block diagram illustrating an example of a configuration of an authentication server 32.

FIG. 11 is a functional block diagram illustrating an example of a functional configuration of the authentication server 32. As illustrated in FIG. 11, the authentication server 32 includes an authentication server controller 321 that controls components of the authentication server 32, a storage unit 322 that has stored therein various types of information, and a communicator 323 for performing communication with external devices existing outside the authentication server 32. Among these components, the storage unit 322 has stored therein the control program PGs2 of the authentication server 32, and authentication information DT32 to be used for authenticating a user U. The storage unit 322 is a function provided by the storage device 3202. The authentication server controller 321 is a function realized by the processor 3201 by executing the control program PGs2 stored in the storage device 3202 and operating in accordance with the control program PGs2. The communicator 323 is a function provided by the communication device 3203.

1-3-4. Functions Realized by Lobby Server

Figure 12:
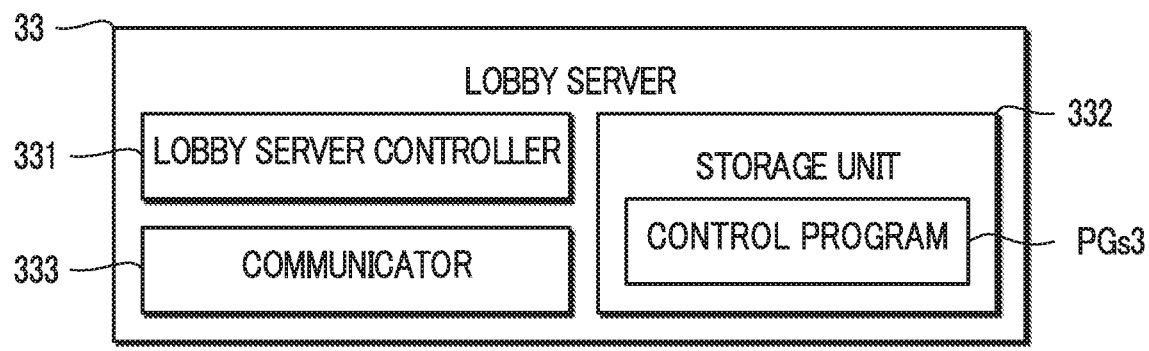
FIG. 12 is a block diagram illustrating an example of a configuration of a lobby server 33.

FIG. 12 is a functional block diagram illustrating an example of a functional configuration of the lobby server 33. As illustrated in FIG. 12, the lobby server 33 includes a lobby server controller 331 that controls components of the lobby server 33, a storage unit 332 that has stored therein various types of information, and a communicator 333 for performing communication with external devices existing outside the lobby server 33. Among these components, the storage unit 332 has stored therein the control program PGs3 of the lobby server 33. The storage unit 332 is a function provided by the storage device 3302. The lobby server controller 331 is a function realized by the processor 3301 by executing the control program PGs3 stored in the storage device 3302 and operating in accordance with the control program PGs3. The communicator 333 is a function provided by the communication device 3303.

1-3-5. Functions Realized by Game Server

Figure 13:
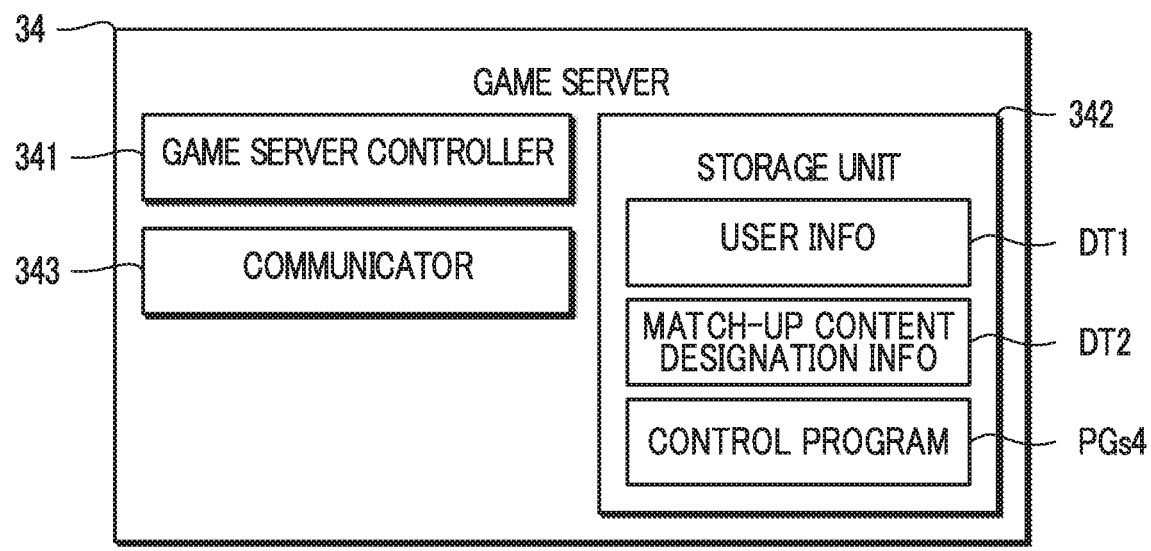
FIG. 13 is a block diagram illustrating an example of a configuration of a game server 34.

FIG. 13 is a functional block diagram illustrating an example of a functional configuration of the game server 34. As illustrated in FIG. 13, the game server 34 (an example of "server device") includes a game server controller 341 that controls components of the game server 34, a storage unit 342 that has stored therein various types of information, and a communicator 343 for performing communication with external devices existing outside the game server 34. Among these components, the storage unit 342 has stored therein the control program PGs4 of the game server 34, the user information DT1, and the match-up content designation information DT2. The storage unit 342 is a function provided by the storage device 3402. The game server controller 341 is a function realized by the processor 3401 by executing the control program PGs4 stored in the storage device 3402 and operating in accordance with the control program PGs4. The communicator 343 is a function provided by the communication device 3403.

1-4. Operation of Game System

An operation of the game system SYS is explained below with reference to FIGS. 14 to 18. FIGS. 14 to 18 mainly describe an operation of the game terminal 10-1 in a case in which the user U-1 of the game terminal 10-1 plays against the user U-2 of the game terminal 10-2 in match-up for a soccer game.

1-4-1. Match-up Preparation Processing

Description will first be given of an operation of the game system SYS in a case in which the match-up preparation processing is performed, with reference to FIGS. 14 and 15.

Figure 14:
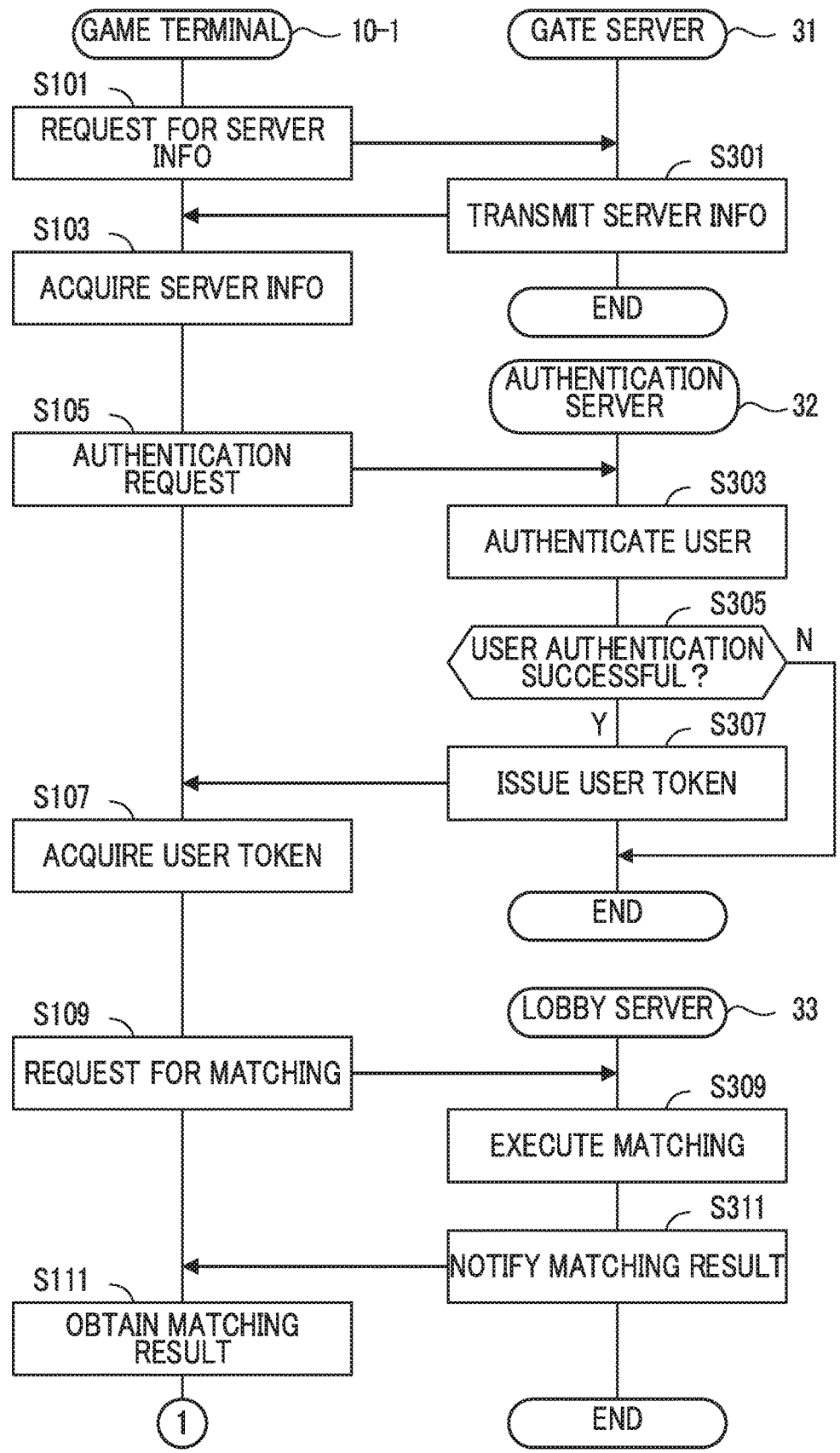
FIG. 14 is a sequence chart illustrating an example of an operation of the game system SYS.

As illustrated in FIG. 14, when the user U-1 starts a soccer game in the game terminal 10-1 and selects the match-up button A12 on the menu screen G1, the game processor 115 of the game terminal 10-1 requests the gate server 31 for the server information DT31 (Step S101).

When the gate server 31 receives the request for the server information DT31 from the game terminal 10-1, the gate server controller 311 of the gate server 31 transmits the server information DT31 to the game terminal 10-1 (Step S301). The game processor 115 of the game terminal 10-1 acquires the server information DT31 transmitted from the gate server 31 (Step S103). In this case, "acquiring information" may be, for example, loading information into a RAM of the storage device 1001-1.

Next, the game processor 115 of the game terminal 10-1 accesses the authentication server 32 on the basis of the server information DT31 and issues an authentication request to the authentication server 32 for authenticating the user U-1 of the game terminal 10-1 (Step S105).

When the authentication server 32 receives the authentication request from the game terminal 10-1, the authentication server controller 321 of the authentication server 32 authenticates the user U-1 (Step S303).

Next, the authentication server controller 321 of the authentication server 32 determines whether the authentication result at Step S303 is successful (Step S305). When a result of the determination at Step S305 is negative, the authentication server controller 321 controls the communicator 323 to transmit a predetermined error message to the game terminal 10-1, and ends processing illustrated in FIGS. 14 to 18. On the other hand, when a result of the determination at Step S305 is affirmative, the authentication server controller 321 issues a user token and controls the communicator 323 to transmit the issued user token to the game terminal 10-1 (Step S307).

Next, the game processor 115 of the game terminal 10-1 acquires the user token transmitted from the authentication server 32 (Step S107). The game processor 115 of the game terminal 10-1 accesses the lobby server 33 on the basis of the server information DT31 acquired at Step S103 and requests the lobby server 33 to perform matching (Step S109).

When the lobby server 33 receives the matching request from the game terminal 10-1, the lobby server controller 331 of the lobby server 33 performs matching (Step S309). As described above, in the example illustrated in FIGS. 14 to 18, there is assumed a case in which the lobby server controller 331 selects the user U-1 and the user U-2 to be matched with each other. The lobby server controller 331 controls the communicator 333 to transmit a result of the matching at Step S309 to the game terminal 10-1 (Step S311). Next, the game processor 115 of the game terminal 10-1 acquires a result of the matching transmitted from the lobby server 33 (Step S111).

Figure 15:
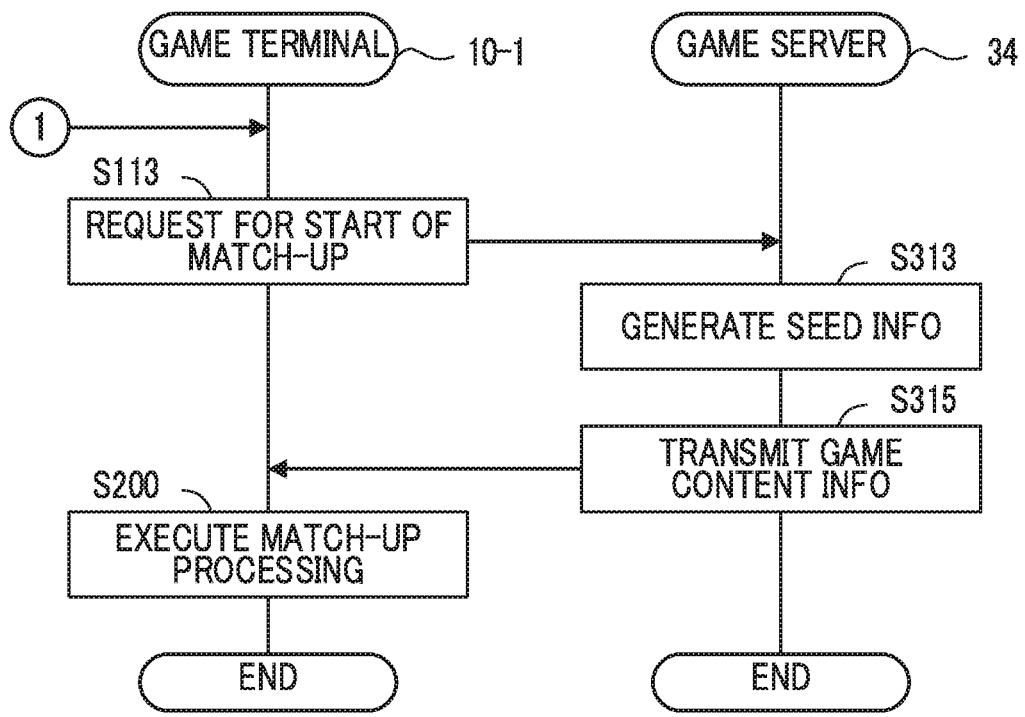
FIG. 15 is a sequence chart illustrating an example of an operation of the game system SYS.

As illustrated in FIG. 15, the game processor 115 of the game terminal 10-1 accesses the game server 34 on the basis of the server information DT31 acquired at Step S103 and requests the game server 34 to start match-up (Step S113).

When the game server 34 receives the request for start of match-up from the game terminal 10-1, the game server controller 341 of the game server 34 generates seed information (Step S313).

Next, the game server controller 341 of the game server 34 controls the communicator 343 to transmit to the game terminal 10-1 the game content information DT0 (the user information DT1 and the match-up content designation information DT2) including the seed information generated at Step S313 (Step S315).

When the game terminal 10-1 receives the game content information DT0 transmitted from the game server 34, the game progressor 111 of the game terminal 10-1 ends the match-up preparation processing and performs match-up progression processing that is processing of progressing the match-up for the soccer game (Step S200).

1-4-2. Match-up Progression Processing

Description will now be given of an operation of the game terminal 10-1 in a case in which the match-up progression processing according to Step S200 is performed, with reference to FIGS. 16 to 18.

Figure 16:
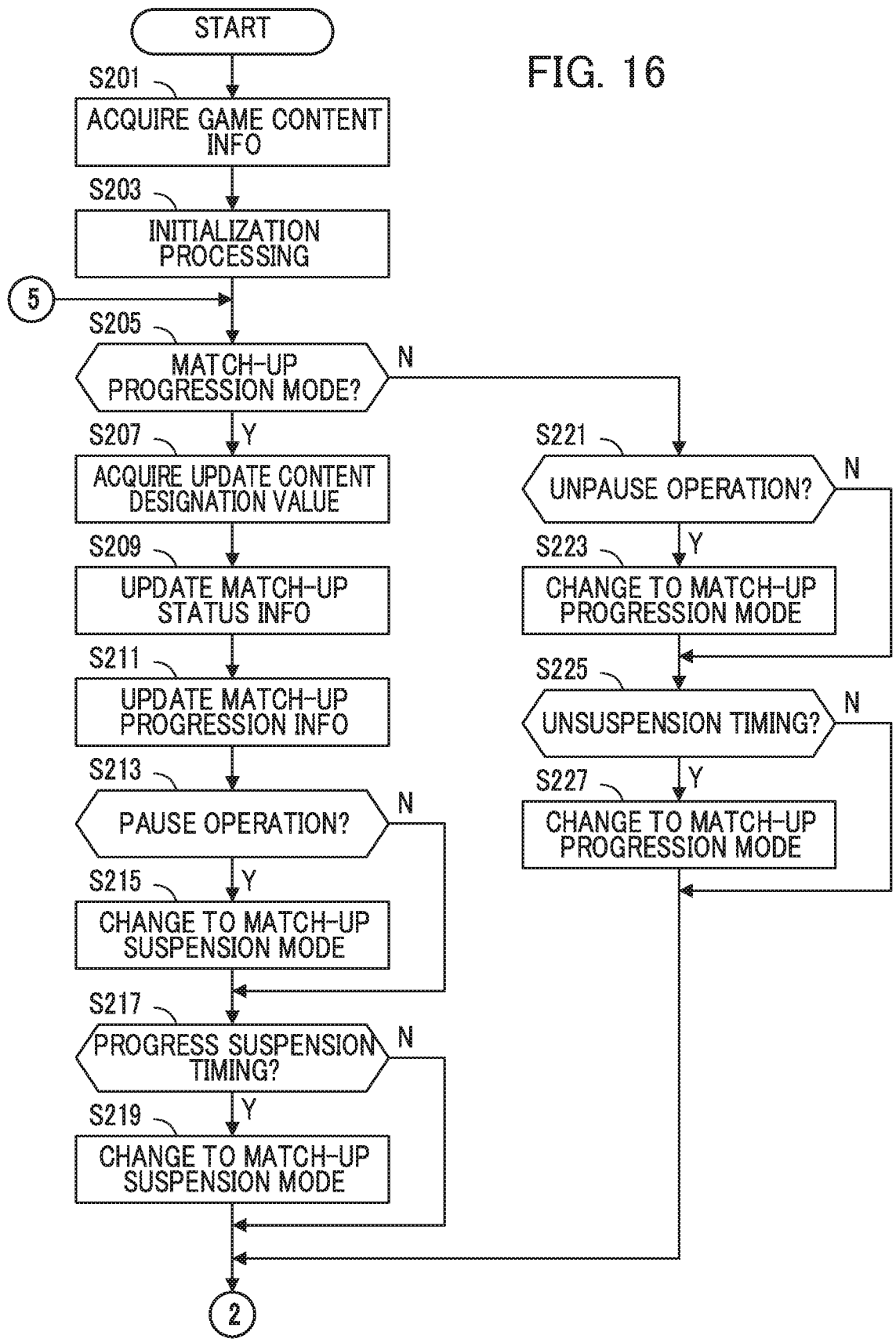
FIG. 16 is a flowchart illustrating an example of an operation of the game terminal 10.

As illustrated in FIG. 16, in the match-up progression processing, the game content information acquirer 118 of the game terminal 10-1 acquires the game content information DT0 transmitted from the game server 34 at Step S315 (Step S201). The game content information acquirer 118 generates update content designation information on the basis of the match-up content designation information DT2 included in the game content information DT0 acquired from the game server 34 at Step S201.

Next, the game processor 115 of the game terminal 10-1 performs initialization processing (Step S203). The initialization processing is, for example, processing including processing of setting the number GT1 of updates indicated by the match-up progression information DT4 to an initial value such as "0", and processing of setting the game mode indicated by the game mode information DT5 to "the match-up progression mode".

Next, the game mode setter 114 of the game terminal 10-1 determines whether the game mode indicated by the game mode information DT5 is the match-up progression mode (Step S205). When a result of the determination at Step S205 is affirmative, the game content information acquirer 118 of the game terminal 10-1 acquires the update content designation value B[k] from the update content designation information generated at Step S201 (Step S207). Next, the match-up status information updater 112 of the game terminal 10-1 progresses the match-up for the soccer game by updating the match-up status information DT3 on the basis of the update content designation value B[k] acquired by the game content information acquirer 118 at Step S207 (Step S209). The match-up progression information updater 113 of the game terminal 10-1 updates the number GT1 of updates indicated by the match-up progression information DT4 with "k" (Step S211). Specifically, the match-up progression information updater 113 adds "1" to the number GT1 of updates indicated by the match-up progression information DT4 so as to update the number GT1 of updates indicated by the match-up progression information DT4 from "k−1" to "k" at Step S211.

Next, the operation receiver 124 of the game terminal 10-1 determines whether the user U-1 of the game terminal 10-1 has performed a pause operation of selecting the pause button A21 (Step S213). When a result of the determination at Step S213 is negative, the operation receiver 124 causes the processing to proceed to Step S217. When a result of the determination at Step S213 is affirmative, the game mode setter 114 of the game terminal 10-1 suspends the progress of the match-up for the soccer game by changing the game mode indicated by the game mode information DT5 to the match-up suspension mode (Step S215). The game mode setter 114 of the game terminal 10-1 determines whether the number GT1 of updates indicated by the match-up progression information DT4 has reached "the predetermined number Khf", to determine whether a timing (a progress suspension timing) to start the halftime has arrived (Step S217). When a result of the determination at Step S217 is negative, the game mode setter 114 causes the processing to proceed to Step S251. When a result of the determination at Step S217 is affirmative, the game mode setter 114 of the game terminal 10-1 suspends the progress of the match-up for the soccer game by changing the game mode indicated by the game mode information DT5 to the match-up suspension mode (Step S219) and causes the processing to proceed to Step S251.

When a result of the determination at Step S205 is negative, the operation receiver 124 of the game terminal 10-1 determines whether the user U-1 of the game terminal 10-1 has performed an unpause operation (an example of "predetermined operation") of selecting the pause button A21 again during pausing (Step S221). When a result of the determination at Step S221 is negative, the operation receiver 124 causes the processing to proceed to Step S225. When a result of the determination at Step S221 is affirmative, the game mode setter 114 of the game terminal 10-1 unsuspends the progress of the match-up for the soccer game by changing the game mode indicated by the game mode information DT5 to the match-up progression mode (Step S223). The game mode setter 114 of the game terminal 10-1 determines whether the predetermined time length Thf has elapsed from the start of the halftime and a timing (an unsuspension timing) to end the halftime has arrived (Step S225). The game mode setter 114 may determine that the unsuspension timing to end the halftime has arrived in a case in which the user U-1 of the game terminal 10-1 has performed a predetermined halftime ending operation using the input unit 150 at Step S225. When a result of the determination at Step S225 is negative, the game mode setter 114 causes the processing to proceed to Step S251. When a result of the determination at Step S225 is affirmative, the game mode setter 114 of the game terminal 10-1 unsuspends the progress of the match-up for the soccer game by changing the game mode indicated by the game mode information DT5 to the match-up progression mode (Step S227) and causes the processing to proceed to Step S251.

Figure 17:
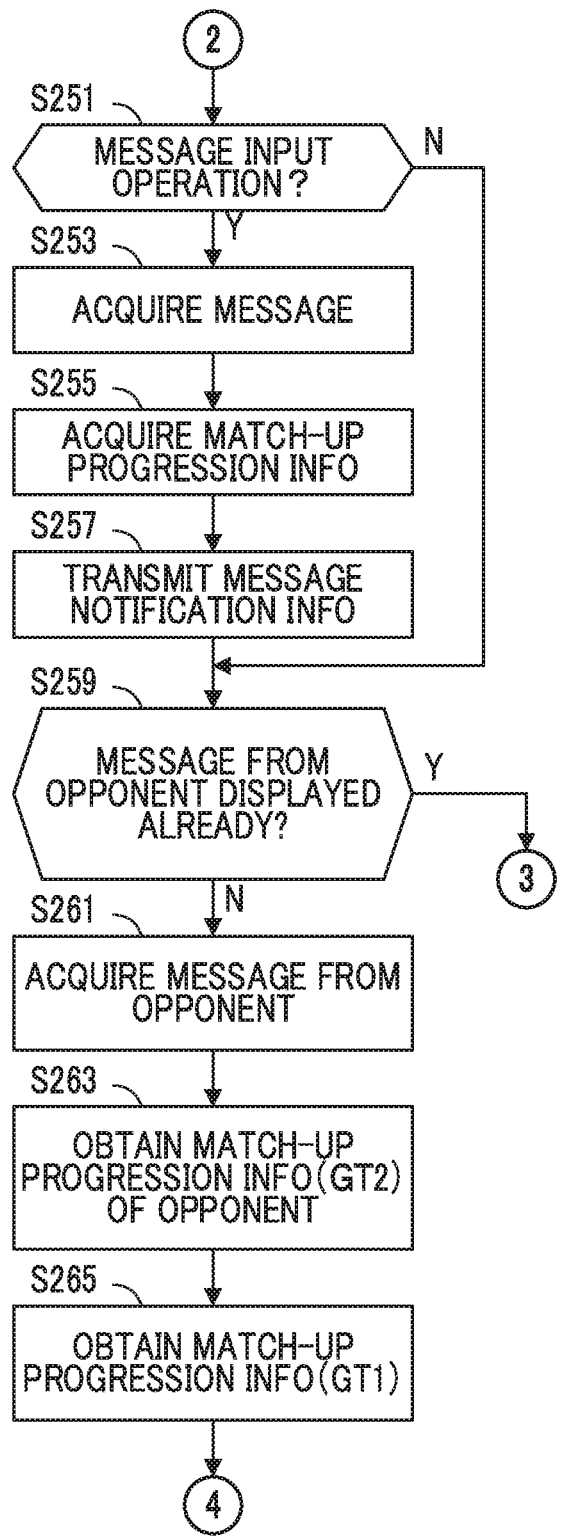
FIG. 17 is a flowchart illustrating an example of an operation of the game terminal 10.

As illustrated in FIG. 17, the operation receiver 124 of the game terminal 10-1 determines whether the user U-1 of the game terminal 10-1 has performed a message input operation of selecting a stamp A25 (Step S251). When a result of the determination at Step S251 is negative, the operation receiver 124 causes the processing to proceed to Step S259. When a result of the determination at Step S251 is affirmative, the message acquirer 117 of the game terminal 10-1 acquires a message corresponding to the stamp A25 selected by the user U-1 (Step S253). The match-up progression information acquirer 116 of the game terminal 10-1 acquires match-up progression information DT4 from the storage unit 130 of the game terminal 10-1 (Step S255). As described above, the match-up progression information DT4 acquired by the match-up progression information acquirer 116 at Step S255 indicates the number GT1 of updates of the match-up status information DT3 in the game terminal 10-1 at a timing when the message was input at the game terminal 10-1. The game processor 115 of the game terminal 10-1 controls the communicator 140 to enable message notification information DTm including the message acquired by the message acquirer 117 at Step S253 and the match-up progression information DT4 acquired by the match-up progression information acquirer 116 at Step S255 to be transmitted to the game terminal 10-2 (Step S257). The game terminal 10-1 may transmit the message notification information DTm directly to the game terminal 10-2 without transmitting via the game server 34, or may transmit the message notification information DTm via the game server 34.

Next, the message acquirer 117 of the game terminal 10-1 receives the message notification information DTm from the game terminal 10-2 and determines whether display of a message indicated by the received message notification information DTm on the display unit 160 is already performed (Step S259). When a result of the determination at Step S259 is affirmative, the message acquirer 117 causes the processing to proceed to Step S279. When a result of the determination at Step S259 is negative, the message acquirer 117 of the game terminal 10-1 acquires the message contained in the message notification information DTm received from the game terminal 10-2 (Step S261). The message acquirer 117 of the game terminal 10-1 acquires the match-up progression information DT4 contained in the message notification information DTm received from the game terminal 10-2 (Step S263). As described above, the match-up progression information DT4 acquired by the message acquirer 117 at Step S263 indicates the number GT2 of updates of the match-up status information DT3 in the game terminal 10-2 at a timing when the message indicated by the message notification information DTm was input at the game terminal 10-2. The match-up progression information acquirer 116 of the game terminal 10-1 acquires the match-up progression information DT4 from the storage unit 130 of the game terminal 10-1 (Step S265). As described above, the match-up progression information DT4 acquired by the match-up progression information acquirer 116 at Step S265 indicates the number GT1 of updates of the match-up status information DT3 in the game terminal 10-1 at a timing when the process at Step S265 is performed.

Figure 18:
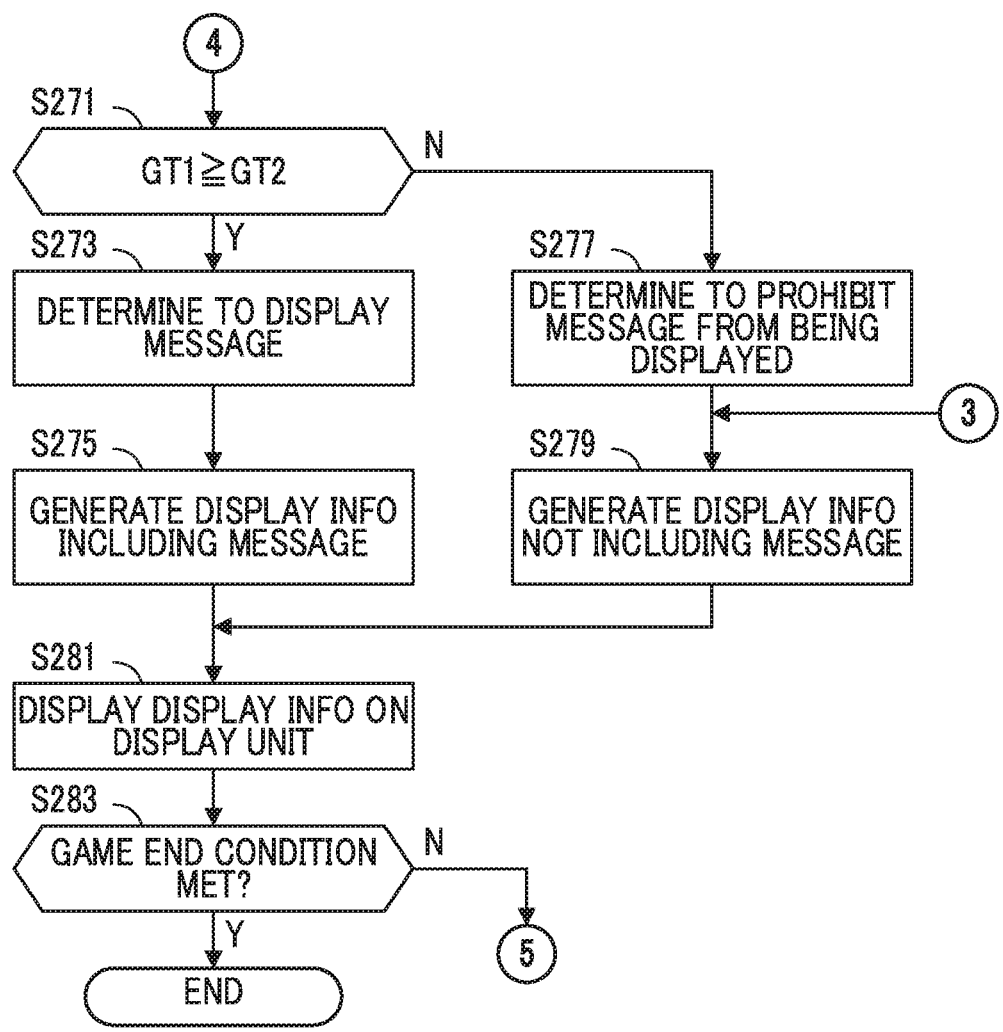
FIG. 18 is a flowchart illustrating an example of an operation of the game terminal 10.

As illustrated in FIG. 18, the message display determiner 122 of the game terminal 10-1 determines whether the number GT1 of updates indicated by the match-up progression information DT4 acquired by the match-up progression information acquirer 116 at Step S265 is equal to or greater than the number GT2 of updates indicated by the match-up progression information DT4 acquired by the message acquirer 117 at Step S263 (Step S271). In other words, the message display determiner 122 compares the number GT1 of updates with the number GT2 of updates at Step S271. When a result of the determination at Step S271 is affirmative, the message display determiner 122 of the game terminal 10-1 determines that the message contained in the message notification information DTm received from the game terminal 10-2 is to be displayed on the display unit 160 of the game terminal 10-1 (Step S273). In other words, at Step S273, the message display determiner 122 determines that the message contained in the message notification information DTm received from the game terminal 10-2 is to be displayed on the display unit 160 of the game terminal 10-1 based on the comparison result at Step S271. The display information generator 123 of the game terminal 10-1 generates display information indicative of an image that includes the message contained in the message notification information DTm received from the game terminal 10-2 (Step S275). When a result of the determination at Step S271 is negative, the message display determiner 122 of the game terminal 10-1 determines to temporarily prohibit the message contained in the message notification information DTm received from the game terminal 10-2 from being displayed on the display unit 160 of the game terminal 10-1 (Step S277). In other words, at Step S277, the message display determiner 122 determines to prohibit the message contained in the message notification information DTm received from the game terminal 10-2 from being displayed on the display unit 160 of the game terminal 10-1 on the basis of the comparison result at Step S271. The display information generator 123 of the game terminal 10-1 generates display information indicative of an image that does not include the message contained in the message notification information DTm received from the game terminal 10-2 (Step S279). Thereafter, the display information generator 123 of the game terminal 10-1 causes the image based on the display information generated at Step S275 or S279 to be displayed on the display unit 160 of the game terminal 10-1 (Step S281).

Next, the game processor 115 of the game terminal 10-1 determines whether a predetermined game end condition has been met (Step S283). The predetermined game end condition is, for example, arrival of a timing when the match-up for the soccer game is to be ended. When a result of the determination at Step S283 is negative, the game processor 115 causes the processing to proceed to Step S205. When a result of the determination at Step S283 is affirmative, the game processor 115 ends the match-up progression processing.

1-5. Summary of Embodiment

According to the present embodiment, when progression contents of match-up performed in the game terminal 10-1 and progression contents of match-up performed in the game terminal 10-2 are the same, output of a message input from the game terminal 10-2 to the game terminal 10-1 is prohibited until the degree of progress of the match-up in the game terminal 10-1 reaches the degree of progress of the match-up in the game terminal 10-2. Therefore, according to the present embodiment, it is possible to prevent the user U-1 of the game terminal 10-1 from seeing the message from the user U-2 of the game terminal 10-2 when the progress of the match-up in the game terminal 10-1 is behind the progress of the match-up in the game terminal 10-2. That is, according to the present embodiment, it is possible to prevent the user U-1 of the game terminal 10-1 from predicting future developments in the match-up on the basis of the message from the user U-2 of the game terminal 10-2. Accordingly, according to the present embodiment, it is possible to prevent diminishing the level of amusement of the soccer game due to predictability of future developments of match-up on the basis of a message from an opponent.

According to the present embodiment, a message input from the game terminal 10-2 to the game terminal 10-1 is output without being prohibited when progression contents of match-up performed in the game terminal 10-1 and progression contents of match-up performed in the game terminal 10-2 are the same and the degree of progress of the match-up in the game terminal 10-1 is ahead of the degree of progress of the match-up in the game terminal 10-2. Therefore, according to the present embodiment, a message input by the user U-2 of the game terminal 10-2 can be promptly provided to the user U-1 of the game terminal 10-1 when the progress of the match-up in the game terminal 10-2 is behind the progress of the match-up in the game terminal 10-1. Accordingly, the present embodiment can prevent delay in the outputting of a message from the user U-2 to the game terminal 10-1, where the message is input at the game terminal 10-2 when being behind in the progress.

Furthermore, according to the present embodiment, when the user U-1 of the game terminal 10-1 and the user U-2 of the game terminal 10-2 are matched up to play against each other, the game content information DT0 of same contents is supplied from the game server 34 to both the game terminal 10-1 and the game terminal 10-2. The game terminal 10-1 and the game terminal 10-2 perform the match-up on the basis of the game content information DT0 supplied from the game server 34. Therefore, according to the present embodiment, each of the game terminal 10-1 and the game terminal 10-2 can individually progress the match-up of the same contents without performing communication between the game terminal 10-1 and the game terminal 10-2. Accordingly, the present embodiment can reduce the communication load on the game system SYS.

According to the present embodiment, the game terminal 10 generates the update content designation information on the basis of the seed information and the designation value generation rule information included in the match-up content designation information DT2 supplied from the game server 34. Therefore, according to the present embodiment, the communication load can be effectively reduced as compared to a case in which update content designation information is generated in the game server 34 and the generated update content designation information is transmitted to the game terminal 10.

According to the present embodiment, when the degree of progress of match-up in the game terminal 10-1 is behind the degree of progress of the match-up in the game terminal 10-2, output of a message input at the game terminal 10-2 is prohibited at the game terminal 10-1 until the degree of progress of the match-up in the game terminal 10-1 reaches the degree of progress of the match-up in the game terminal 10-2. In other words, according to the present embodiment, the game terminal 10-2 can transmit a message input at the game terminal 10-2 to the game terminal 10-1 without considering the degree of progress of the match-up in the game terminal 10-1 when the degree of progress of the match-up in the game terminal 10-2 is ahead of the degree of progress of the match-up in the game terminal 10-1. Therefore, according to the present embodiment, the processing load on the game terminal 10-2 can be reduced, for example, as compared to a form in which the game terminal 10-2 is prohibited from transmitting to the game terminal 10-1 a message that is input at the game terminal 10-2 until the degree of progress of the match-up in the game terminal 10-1 reaches the degree of progress of the match-up in the game terminal 10-2.

Furthermore, the present embodiment eliminates, for example, the need to supply information indicative of the degree of progress of the match-up in the game terminal 10-1 to the game terminal 10-2. Therefore, the communication load between the game terminal 10-1 and the game terminal 10-2 can be reduced, for example, as compared to a form in which the game terminal 10-2 is prohibited from transmitting to the game terminal 10-1 a message that is input at the game terminal 10-2 until the degree of progress of the match-up in the game terminal 10-1 reaches the degree of progress of the match-up in the game terminal 10-2.

In the present embodiment, the user information DT1 may be understood, for example, as "game data" that are referred to at the time of performing match-up for a soccer game and that influence a result of the match-up. Accordingly, the game content information acquirer 118 that acquires the user information DT1 may be understood, for example, as a "game data acquirer" that acquires game data. In the present embodiment, for example, a "random value" may be adopted as the seed value. Therefore, the game content information acquirer 118 that acquires the match-up content designation information DT2 including the seed value may be understood, for example, as a "random number acquirer" that acquires a random value. In the present embodiment, the match-up status information DT3 may be understood, for example, as "status data" indicative of the status of match-up. Therefore, the match-up status information updater 112 that updates the match-up status information DT3 may be understood, for example, as an "updater" that updates status data. In the present embodiment, the match-up progression information DT4 contained in the message notification information DTm that a game terminal 10 has acquired from another game terminal 10 may be understood, for example, as "progression information" indicative of the progress status of match-up in the other game terminal 10. Therefore, the message acquirer 117 that acquires a message and the match-up progression information DT4 from the other game terminal 10 may be understood, for example, as a "message receiver" that receives a message and progression information from the other game terminal 10. In the present embodiment, the number GT-x of internal updates indicated by the match-up progression information DT4 stored in the storage unit 130 of a game terminal 10 may be understood, for example, as a "progress status" of match-up in the game terminal 10, and the number GT-y of acquired updates indicated by the match-up progression information DT4 contained in the message notification information DTm received from another game terminal 10 may be understood, for example, as a "progress status" of match-up as of the time when a message was input at the other game terminal 10. Accordingly, the message display determiner 122 that prohibits a message received from the other game terminal 10 from being displayed on the display unit 160 until a timing when the number GT-x of internal updates becomes equal to or greater than the number GT-y of acquired updates may be understood, for example, as a "restrictor" that restricts output of a message until the progress status of match-up that is being performed in the game terminal 10 becomes the progress status as of when the message was input at the other game terminal 10.

2. Modifications

Each aspect illustrated above may be variously modified. Specific modified aspects are illustrated below. Two or more aspects freely selected from the following descriptions may be combined with one another as appropriate within a range in which no mutual conflict is caused. In each modification illustrated below, as for elements having functions or effects identical to those of the embodiment, reference signs used in the above descriptions are used and detailed explanations of such elements are omitted as appropriate.

First Modification

In the embodiment described above, the game terminal 10 includes the game progressor 111, the match-up progression information acquirer 116, the message acquirer 117, the game content information acquirer 118, the display controller 121, and the operation receiver 124. However, the present invention is not limited to this form and some or all of these functions may be realized, for example, in the game server 34.

For example, the game system SYS may include a game server 34C explained later, instead of the game server 34 and may include game terminals 10C-1 to 10C-M explained later, instead of the game terminals 10-1 to 10-M.

Figure 19:
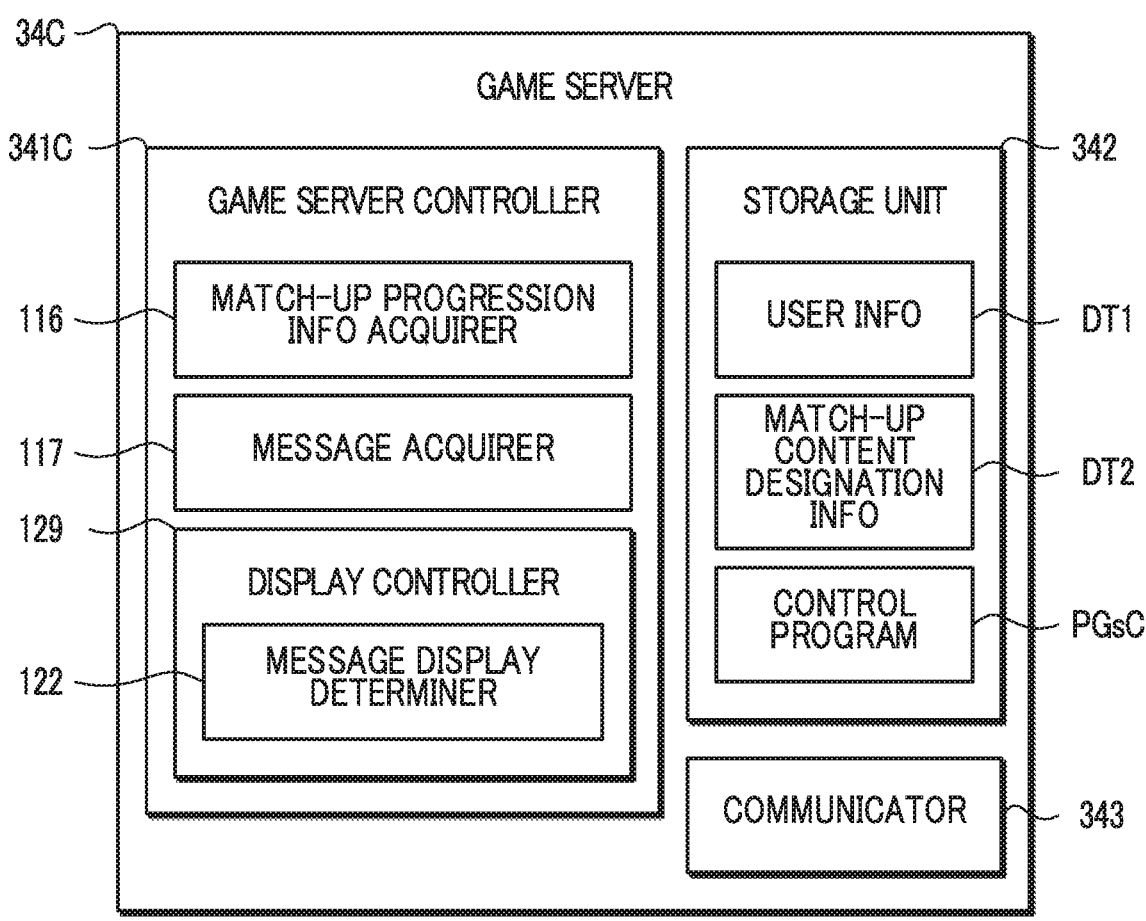
FIG. 19 is a block diagram illustrating an example of a configuration of a game server 34C according to a first modification of the present invention.

FIG. 19 is a functional block diagram illustrating an example of a functional configuration of the game server 34C. The game server 34C is different from the game server 34 in that the game server 34C has a control program PGsC instead of the control program PGs4 stored in the storage unit 342, and in that the game server 34C has a game server controller 341C instead of the game server controller 341. The game server controller 341C is a function realized by a processor of the game server 34C, by executing the control program PGsC and operating in accordance with the control program PGsC. The game server controller 341C includes the match-up progression information acquirer 116, the message acquirer 117, and a display controller 129. The display controller 129 is different from the display controller 121 in not including the display information generator 123.

Figure 20:
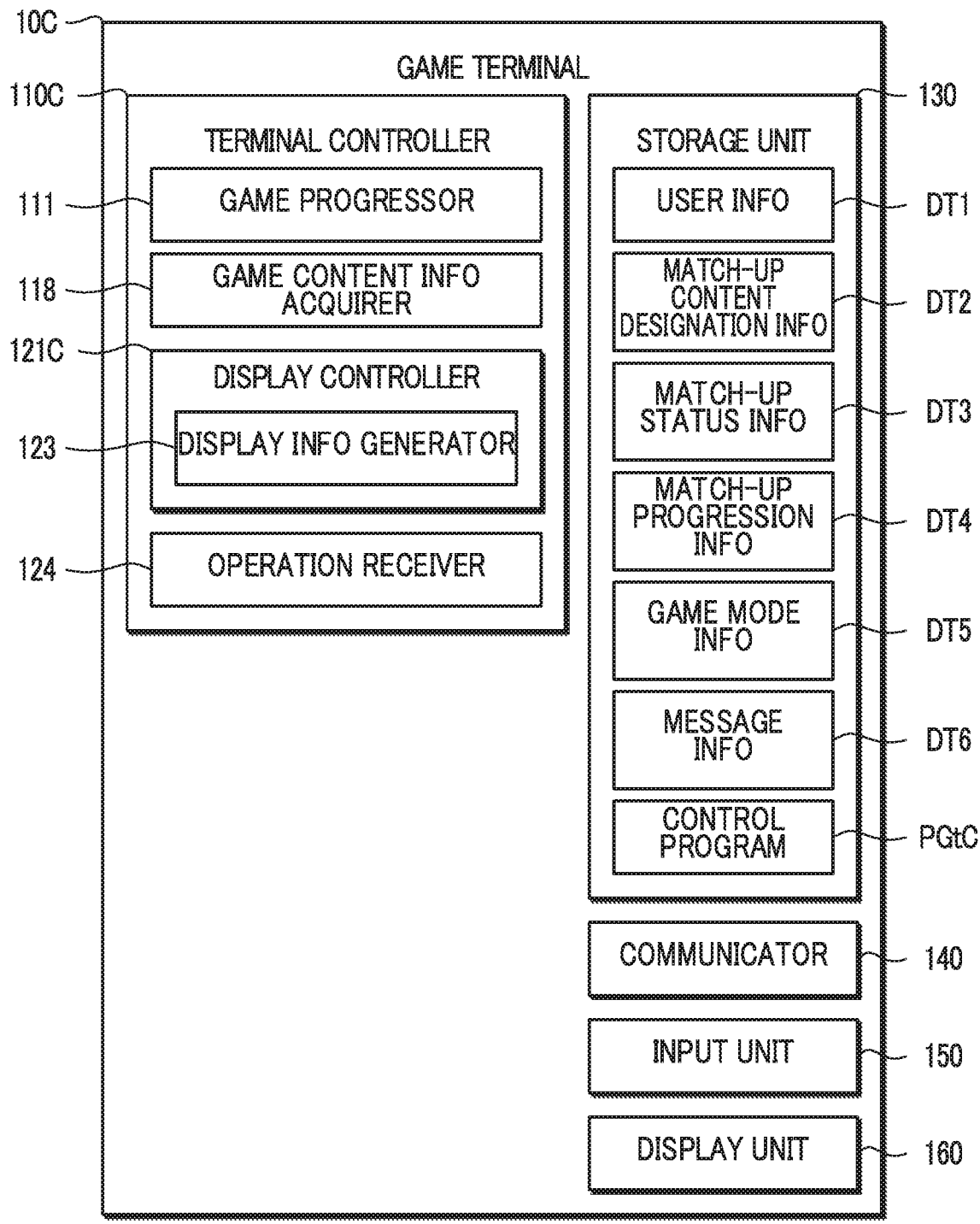
FIG. 20 is a block diagram illustrating an example of a configuration of a game terminal 10C.

FIG. 20 is a functional block diagram illustrating an example of a functional configuration of the game terminal 10C. The game terminal 10C is different from the game terminal 10 in that the game terminal 10C has a control program PGtC instead of the control program PGt stored in the storage unit 130, and in that the game terminal 10C has a terminal controller 110C instead of the terminal controller 110. The terminal controller 110C is a function realized by a processor of the game terminal 10C, by executing the control program PGtC and operating in accordance with the control program PGtC. The terminal controller 110C is different from the terminal controller 110 in that the terminal controller 110C does not have the match-up progression information acquirer 116, in that the terminal controller 110C does not have the message acquirer 117, and in that the terminal controller 110C has a display controller 121C instead of the display controller 121. The display controller 121C is different from the display controller 121 in not including the message display determiner 122.

In the game system according to the present modification, the game progressor 111 (an example of "first game progressor") included in the game terminal 10C-1 (an example of "first terminal apparatus") progresses match-up in the game terminal 10C-1 and the game progressor 111 (an example of "second game progressor") included in the game terminal 10C-2 (an example of "second terminal apparatus") progresses match-up in the game terminal 10C-2. In the game system according to the present modification, the match-up progression information acquirer 116 (another example of "first acquirer") included in the game server 34C acquires the match-up progression information DT4 (another example of "first progression information") stored in the storage unit 130 of the game terminal 10C-1. In the game system according to the present modification, the message acquirer 117 (another example of "second acquirer") included in the game server 34C acquires a message (another example of "input information") input at the game terminal 10C-2 and the match-up progression information DT4 (another example of "second progression information") stored in the storage unit 130 included in the game terminal 10C-2 at the time when the message was input at the game terminal 10C-2. In the game system according to the present modification, the display controller 129 (another example of "output controller") included in the game server 34C controls output of the message input at the game terminal 10C-2 to the display unit 160 (an example of "output unit") included in the game terminal 10C-1.

Second Modification

In the embodiment and the first modification described above, display information that can be visually perceived by a user U, such as text or an image that can be displayed on the display unit, is explained as an example of "output information". However, the present invention is not limited to this form. For example, the "output information" may be voice information that can be aurally perceived by a user U, smell information that can be olfactorily perceived by a user U, or vibration information that can be tactually perceived by a user U.

Third Modification

In the embodiment and the first and second modifications described above, a soccer game is explained as an example of a "game". However, the present invention is not limited to this form. In the present invention, any game in which one user U operating one game terminal and another user U operating another game terminal are matched up, or any game in which one user U and another user U aim for accomplishment of a mission while cooperating with each other, may be adopted as the "game". In the present invention, a sports game in which the subject matter is a sport other than soccer, such as baseball, tennis, American football, basketball, or volleyball may be adopted as the "game". Alternatively, a game of any type other than the sports game, such as a card game, an action game, a role-playing game, or a fighting game, or a game of any category may be adopted as the "game".

Furthermore, in the embodiment and the first and second modifications described above, a case in which a common game is progressed in one game terminal operated by one user U and another game terminal operated by another user U is explained as an example. However, the present invention is not limited to this form. The present invention is also applicable to a case in which common contents are progressed in one game terminal operated by one user U and another game terminal operated by another user U. The common contents may be, for example, video contents, such as a film, a drama, a video obtained by imaging a class, or a video obtained by imaging a match of a sport or a game, or may be audio contents, such as music or audio broadcast.

3. Appendices

The present invention is understood as follows based on the above descriptions, for example. In the following, reference signs in the drawings are denoted in parentheses for convenience in order to facilitate understanding of each aspect, but the present invention is not limited to these aspects illustrated in the drawings.

First Appendix

A program according to one aspect of the present invention is characterized in causing a processor (for example, the processor 1000-1) of a terminal apparatus (for example, the game terminal 10-1) to function as: a game progressor (for example, the game progressor 111) configured to progress a game based on content information that prescribes progression contents of the game; a first acquirer (for example, the match-up progression information acquirer 116) configured to acquire first progression information indicative of a degree of progress of the game in the terminal apparatus; a second acquirer (for example, the message acquirer 117) configured to acquire input information that was input at another terminal apparatus (for example, the game terminal 10-2) that progresses the game based on the content information, and second progression information indicative of a degree of progress of the game in the other terminal apparatus as of a point in time when the input information was input at the other terminal apparatus; and an output controller (for example, the display controller 121) configured to control output of output information that corresponds to the input information acquired by the second acquirer based on the first progression information and the second progression information.

In the present aspect, the output controller controls output of output information that corresponds to input information based on the first progression information indicative of a degree of progress of a game in a terminal apparatus, and the second progression information indicative of a degree of progress of the game in another terminal apparatus as of a point in time when the input information was input at the other terminal apparatus. Therefore, according to the present aspect, the output information corresponding to the input information can be prohibited from being output when the degree of progress of the game in the other terminal apparatus is ahead of the degree of progress of the game in the subject terminal apparatus. Accordingly, the present aspect can prevent a user of a terminal apparatus from knowing, based on output information corresponding to input information that is input at another terminal apparatus in which the degree of progress of the game is ahead of that in the subject terminal apparatus, a progress status of the game more in the future than the progress status of the game in the subject terminal apparatus. Therefore, according to the present aspect, it is possible to prevent diminution of the level of amusement of a game due to a situation in which a user of a terminal apparatus is able to anticipate future development of progress of the game.

In this aspect, the "content information" may be, for example, information (hereinafter, "progression content designation information") that designates progression contents themselves of the game in the terminal apparatus, or may be information (hereinafter, "determination method prescriptive information") that prescribes a determination method of the progression contents of the game in a case in which the progression contents are determined in the terminal apparatus. The "progression content designation information" may be, for example, information indicative of the progression contents themselves of the game. The "progression content designation information" may be, for example, information (hereinafter, "update content designation information") that designates update contents of the match-up status information in a case in which the terminal apparatus progresses the game by updating the match-up status information indicative of the progress status of the game. The "determination method prescriptive information" may be, for example, information that prescribes a method for generating the update content designation information in a case in which the update content designation information is generated in the terminal apparatus. Specifically, the "determination method prescriptive information" may be, for example, information indicative of a rule or a function (hereinafter, "generation rule") used to generate the update content designation information in the terminal apparatus. For example, in a case in which the generation rule is a function that outputs update content designation information indicative of a value corresponding to an input value that is input to the generation rule, the "determination method prescriptive information" may be information indicative of the input value to the function. The "input value" may be a value that can provide randomness to a value indicated by the update content designation information, such as a random number or a timestamp, or may be a value that permits the update content designation information to be a constant value, such as information for identifying the user of the terminal apparatus or a predetermined value.

In this aspect, the "first progression information" may be, for example, the number of times of processing of progressing the game, which is performed in the terminal apparatus, or may be a duration of a period in which the game is progressing in the terminal apparatus.

In this aspect, the "input information" may be, for example, information that can be visually perceived by the user of the terminal apparatus, such as an image and text (e.g., a letter string, a character string, etc.), or may be information that can be aurally perceived by the user of the terminal apparatus, such as music and speech. In this aspect, the "input information" may be, for example, information for identifying a piece of information selected by the user of the terminal apparatus from among plural pieces of information that can be visually perceived or plural pieces of information that can be aurally perceived.

In this aspect, the "output information" may be, for example, information that can be visually perceived by the user of the terminal apparatus, such as an image and text (e.g., a letter string, a character string, etc.), or may be information that can be aurally perceived by the user of the terminal apparatus, such as music and speech.

Second Appendix

A program according to another aspect of the present invention is the program according to the first appendix, characterized in that, in a case in which a degree of progress of the game indicated by the second progression information is ahead of a degree of progress of the game indicated by the first progression information, the output controller is configured to prohibit the output information from being output.

According to the present aspect, the output information is prohibited from being output when the degree of progress of a game in the other terminal apparatus is ahead of the degree of progress of the game in the terminal apparatus. Therefore, the present aspect can prevent a user of a terminal apparatus from knowing, based on the output information, a progress status of the game more in the future than the progress status of the game in another terminal apparatus.

In this aspect, "prohibiting the output information from being output" may be prohibiting output of all information constituting the output information. That is, "prohibiting the output information from being output" in this aspect may not include a form of prohibiting only a part of information constituting the output information from being output and permitting, among the information constituting the output information, information other than the part of information prohibited from being output. In this aspect, the output controller may prohibit the output information from being output only when the degree of progress of the game in the other terminal apparatus is ahead of the degree of progress of the game in the terminal apparatus and may remove prohibition of output of the output information when the degree of progress of the game in the subject terminal apparatus reaches the degree of progress of the game in the other terminal apparatus. In other words, in a case in which the degree of progress of the game in the other terminal apparatus is ahead of the degree of progress of the game in the subject terminal apparatus, the output controller may place the output information on standby for output, until the degree of progress of the game in the subject terminal apparatus reaches the degree of progress of the game in the other terminal apparatus. "Placing the output information on standby for output" is a concept including "prohibiting the output information from being output" and "removing prohibition of output of the output information".

Third Appendix

A program according to another aspect of the present invention is the program according to the second appendix, characterized in that the game progressor is configured to update the first progression information according to progress of the game in the terminal apparatus, and the output controller is configured to, after prohibiting the output information from being output, determine to output the output information based on a result of comparison between a degree of progress of the game indicated by the first progression information and a degree of progress of the game indicated by the second progression information.

According to the present aspect, when the degree of progress of the game in the other terminal apparatus as of a point in time when the input information was input is ahead of the degree of progress of the game in the subject terminal apparatus, the output information corresponding to the input information can be prohibited from being output until the degree of progress of the game in the subject terminal apparatus reaches the degree of progress of the game in the other terminal apparatus as of the timing when the input information was input. Therefore, the present aspect can prevent a user of a terminal apparatus from knowing, based on output information, a progress status of the game more in the future than the progress status of the game in the terminal apparatus.

Fourth Appendix

A program according to another aspect of the present invention is the program described in the first to third appendices, characterized in that the output controller is configured to determine to output the output information when a degree of progress of the game indicated by the first progression information is ahead of a degree of progress of the game indicated by the second progression information.

According to the present aspect, the output information is determined to be output at the subject terminal apparatus when the degree of progress of the game in the subject terminal apparatus is ahead of the degree of progress of the game in the other terminal apparatus. Therefore, the present aspect can prevent delay in outputting of input information at a terminal apparatus, where the input information is information input at another terminal apparatus in which the progress of the game is behind that in the subject terminal apparatus.

Fifth Appendix

A program according to another aspect of the present invention is the program described in the first to fourth appendices, characterized in that the game progressor is configured to: update the first progression information according to progress of the game in the terminal apparatus; and suspend updating of the first progression information when progress of the game in the terminal apparatus reaches a predetermined stage.

According to the present aspect, the updating of the first progression information can be suspended when progress of the game reaches, for example, a stage in which the progress of the game is to be suspended. Therefore, the present aspect allows for accurate representation of a degree of progress of a game in a terminal apparatus by the first progression information.

In this aspect, the "predetermined stage" may be a stage in which the degree of progress of the game has reached a predetermined degree or may be a stage in which predetermined contents are realized in the game. The "stage in which the degree of progress of the game has reached a predetermined degree" may be a stage in which the number of times of processing of progressing the game performed in the terminal apparatus has reached a predetermined number, or may be a stage in which the period in which the game is progressed in the terminal apparatus has reached a predetermined time length. Specifically, the "stage in which the degree of progress of the game has reached a predetermined degree" may be arrival of halftime or the end of a match in a soccer game. The "stage in which predetermined contents are realized in the game" may be, for example, a stage in which a mission related to the game is accomplished, a stage in which failure to accomplish a mission related to the game is confirmed, or a stage in which a status arises that is predicated on accomplishment of or failure to accomplish a mission related to the game. Specifically, the "stage in which a mission related to the game is accomplished" may be, for example, a stage in which the victory of a match of soccer in a soccer game is confirmed. The "stage in which failure to accomplish a mission related to the game is confirmed" may be, for example, a stage in which the defeat of a match of soccer in a soccer game is confirmed. The "stage in which a status arises that is predicated on accomplishment of or failure to accomplish a mission related to the game" may be, for example, a stage in which a point is scored or a point is lost in a soccer game.

Sixth Appendix

A program according to another aspect of the present invention is the program described in the fifth appendix, characterized in that the processor is further caused to function as a receiver (for example, the operation receiver 124) configured to receive an operation of a user of the terminal apparatus, and the game progressor is configured to unsuspend updating of the first progression information in response to reception of a predetermined operation by the receiver in a case in which progress of the game in the terminal apparatus has been suspended.

According to the present aspect, when a user of the terminal apparatus performs, for example, an operation to unsuspend progress of the game, the updating of the first progression information can be unsuspended. Therefore, according to the present aspect, the present aspect allows for accurate representation of a degree of progress of a game in a terminal apparatus by the first progression information.

In this aspect, the "predetermined operation" may be, for example, an operation to remove a state in which progress of the game is being suspended.

Seventh Appendix

A program according to another aspect of the present invention is the program described in the first to sixth appendices, characterized in that the game progressor is configured to repeatedly perform progression processing of progressing the game in the terminal apparatus, and the first progression information is indicative of a number of times of the progression processing performed by the game progressor.

Accordingly, the present aspect allows for accurate representation of a degree of progress of a game in a terminal apparatus by the first progression information.

Eighth Appendix

A program according to another aspect of the present invention is the program described in the first to seventh appendices, characterized in that the terminal apparatus and the other terminal apparatus are communicable with a server apparatus (for example, the game server 34) that is configured to generate the content information, the program causes the processor of the terminal apparatus to further function as a third acquirer (for example, the game content information acquirer 118) configured to acquire the content information from the server apparatus, the game progressor is configured to progress the game based on the content information acquired by the third acquirer, and the other terminal apparatus acquires the content information from the server apparatus and progresses the game based on the acquired content information.

According to the present aspect, because the terminal apparatus and the other terminal apparatus progress a game based on content information supplied from the server apparatus, transmission and reception of information related to progression of the game between the terminal apparatus and the other terminal apparatus is not required. Therefore, according to the present aspect, it is possible to reduce the communication load on a network between a terminal apparatus and another terminal apparatus, for example, as compared to a form in which information related to progression of a game is transmitted and received between the subject terminal apparatus and the other terminal apparatus.

Ninth Appendix

A terminal apparatus (for example, the game terminal 10-1) according to one aspect of the present invention is a terminal apparatus that is capable of progressing a game, and is characterized in including a game progressor (for example, the game progressor 111) configured to progress the game based on content information that prescribes progression contents of the game; a first acquirer (for example, the match-up progression information acquirer 116) configured to acquire first progression information indicative of a degree of progress of the game in the terminal apparatus; a second acquirer (for example, the message acquirer 117) configured to acquire input information that was input at another terminal apparatus (for example, the game terminal 10-2) that progresses the game based on the content information, and second progression information indicative of a degree of progress of the game in the other terminal apparatus as of a point in time when the input information was input at the other terminal apparatus; and an output controller (for example, the display controller 121)

configured to control output of output information that corresponds to the input information acquired by the second acquirer based on the first progression information and the second progression information.

According to the present aspect, when the degree of progress of the game in the other terminal apparatus is ahead of the degree of progress of the game in the subject terminal apparatus, output information corresponding to input information can be prohibited from being output. Therefore, the present aspect can prevent a user of a terminal apparatus from knowing a progress status of a game more in the future than a progress status of the game in the subject terminal apparatus based on output information corresponding to input information that is input at the other terminal apparatus in which the degree of progress of the game is ahead that in the subject terminal apparatus.

Tenth Appendix

A game system according one aspect of the present invention is a game system including a plurality of terminal apparatuses capable of progressing a game, and is characterized in including a first game progressor (for example, the game progressor 111 included in the game terminal 10C-1) configured to progress the game in a first terminal apparatus (for example, the game terminal 10C-1) among the plurality of terminal apparatuses based on content information that prescribes progression contents of the game; a second game progressor (for example, the game progressor 111 included in the game terminal 10C-2) configured to progress the game in a second terminal apparatus (for example, the game terminal 10C-2) among the plurality of terminal apparatuses based on the content information; a first acquirer (for example, the match-up progression information acquirer 116) configured to acquire first progression information indicative of a degree of progress of the game in the first terminal apparatus; a second acquirer (for example, the message acquirer 117) configured to acquire input information that was input at the second terminal apparatus, and second progression information indicative of a degree of progress of the game in the second terminal apparatus as of a point in time when the input information was input at the second terminal apparatus; and an output controller (for example, the display controller 129) configured to control output of output information that corresponds to the input information acquired by the second acquirer to an output unit (for example, the display unit 160 included in the game terminal 10C-1) associated with the first terminal apparatus, based on the first progression information and the second progression information.

According to the present aspect, output information that correspond to input information can be prohibited from being output when the degree of progress of the game in the second terminal apparatus is ahead of the degree of progress of the game in the first terminal apparatus. Therefore, the present aspect can prevent a user of a first terminal apparatus from knowing a progress status of the game more in the future than a progress status of the game in the first terminal apparatus based on output information corresponding to input information that was input from a second terminal apparatus in which the degree of progress of the game is ahead that in the first terminal apparatus.

DESCRIPTION OF REFERENCE SIGNS

10 . . . game terminal, 110 . . . terminal controller, 111 . . . game progressor, 112 . . . match-up status information updater, 113 . . . match-up progression information updater, 114 . . . game mode setter, 115 . . . game processor, 116 . . . match-up progression information acquirer, 117 . . . message acquirer, 118 . . . game content information acquirer, 121 . . . display controller, 122 . . . message display determiner, 123 . . . display information generator, 124 . . . operation receiver, 130 . . . storage unit, 140 . . . communicator, 150 . . . input unit, 160 . . . display unit.

What is claimed is:

1. A non-transitory computer-readable recording medium having recorded therein a program for causing a processor of a terminal apparatus to function as:
a game progressor configured to progress a game in which the terminal apparatus is competing against another terminal apparatus to which the terminal apparatus is connected over a network, based on content information that prescribes progression contents of the game for both the terminal apparatus and the another terminal apparatus;
a first acquirer configured to acquire first progression information indicative of a degree of progress of the game in the terminal apparatus, wherein the first progression information includes a first virtual elapsed time corresponding to a duration that the game has been running;
a second acquirer configured to acquire, from the another terminal apparatus, input information that was input at the another terminal apparatus that progresses the game based on the content information, and second progression information indicative of a degree of progress of the game in the another terminal apparatus as of a point in time when the input information was input at the another terminal apparatus, wherein the second progression information includes a second virtual elapsed time corresponding to a duration that the game has been running; and
an output controller configured to compare the first virtual elapsed time acquired by the first acquirer and the second virtual elapsed time acquired by the second acquirer,
wherein when the second virtual elapsed time indicated by the second progression information is greater than the first virtual elapsed time indicated by the first progression information, the output controller is configured to control output of output information that corresponds to the input information acquired by the second acquirer to prohibit the output information from being output.

2. The recording medium according to claim 1, wherein:
the game progressor is configured to update the first progression information according to progress of the game in the terminal apparatus, and
the output controller is configured to, after prohibiting the output information from being output, determine to output the output information based on a result of comparison between the virtual elapsed time indicated by the first progression information that has been updated virtual elapsed time indicated by the second progression information.

3. The recording medium according to claim 1, wherein the game progressor is configured to:
update the first progression information according to progress of the game in the terminal apparatus; and
suspend updating of the first progression information when progress of the game in the terminal apparatus reaches a predetermined stage.

4. The recording medium according to claim 3, wherein:
the processor is further caused to function as a receiver configured to receive an operation of a user of the terminal apparatus, and
the game progressor is configured to unsuspend updating of the first progression information in response to reception of a predetermined operation by the receiver in a case in which progress of the game in the terminal apparatus has been suspended.

5. The recording medium according to claim 1, wherein:
the game progressor is configured to repeatedly perform progression processing of progressing the game in the terminal apparatus, and
the first progression information is indicative of a number of times of the progression processing performed by the game progressor.

6. The recording medium according to claim 1, wherein:
the terminal apparatus and the another terminal apparatus are communicable with a server apparatus that is configured to generate the content information, wherein the content information provided to the first acquirer and second acquirer are the same,
the program causes the processor of the terminal apparatus to further function as a third acquirer configured to acquire the content information from the server apparatus,
the game progressor is configured to progress the game based on the content information acquired by the third acquirer, and
the another terminal apparatus acquires the content information from the server apparatus and progresses the game based on the acquired content information.

7. The recording medium according to claim 1, wherein the first progression information indicates a number of updates of status information in the terminal apparatus, and the second progression information indicates a number of updates of status information in the another terminal apparatus.

8. The recording medium according to claim 1, wherein the input information indicates a message input by a user of the another terminal apparatus, the output information comprises display information indicating an image including the message, and the output controller is further configured to exclude the message from the display information in response to the second virtual elapsed time being greater than the first virtual elapsed time.

9. The recording medium according to claim 1, wherein:
the first progression information indicates a number of updates of status information in the terminal apparatus,
the second progression information indicates a number of updates of status information in the another terminal apparatus,
the input information indicates a message input by a user of the another terminal apparatus, and
the output information comprises display information indicating an image including the message.

10. The recording medium according to claim 1, wherein:
the first progression information indicates the degree of progression of the game currently progressing in the terminal apparatus, and
the another terminal apparatus progresses the game based on the same content information prescribing the procession contents of the game, and
the second progression information indicates the degree of progress of the game currently progressing in the another terminal apparatus, and the output controller is further configured to control output of the output information to prohibit the output information from being output when the degree of progress of the game indicated by the second progression information is ahead of the degree of progress of the game indicated by the first progression information.

11. The recording medium according to claim 1, wherein the output controller is configured to, after prohibiting the output information from being output, output the output information after a delay of time equal to the difference between the first virtual elapsed time and the second virtual elapsed time.

12. The recording medium according to claim 1, wherein the terminal apparatus and the another terminal apparatus are progressing a same match of the game.

13. A terminal apparatus for progressing a game, the terminal apparatus comprising:
a memory storing machine instructions; and
at least one processor that implements the machine instructions to execute a method of:
progressing the game in which the terminal apparatus is competing against another terminal apparatus to which the terminal apparatus is connected over a network based on content information that prescribes progression contents of the game for both the terminal apparatus and the another terminal apparatus that prescribes progression contents of the game;
acquiring first progression information indicative of a degree of progress of the game in the terminal apparatus, wherein the first progression information includes a first virtual elapsed time corresponding to a duration that the game has been running;
acquiring, from the another terminal apparatus, input information that was input at the another terminal apparatus that progresses the game based on the content information, and second progression information indicative of a degree of progress of the game in the another terminal apparatus as of a point in time when the input information was input at the another terminal apparatus, wherein the second progression information includes a second virtual elapsed time corresponding to a duration that the game has been running; and
controlling output of output information based on comparing the first virtual elapsed time and the second virtual elapsed time,
wherein when the second virtual elapsed time indicated by the acquired second progression information is greater than the first virtual elapsed time indicated by the acquired first progression information, the controlling comprises controlling the output of output information to prohibit the output information from being output.

14. The terminal apparatus according to claim 13, wherein the first progression information indicates a number of updates of status information in the terminal apparatus, and the second progression information indicates a number of updates of status information in the another terminal apparatus.

15. The terminal apparatus according to claim 13, wherein the input information indicates a message input by a user of the another terminal apparatus, the output information comprises display information indicating an image including the message, and the output controller is further configured to exclude the message from the display information in response to the second virtual elapsed time being greater than the first virtual elapsed time.

16. The terminal apparatus according to claim 13, wherein:
   the first progression information indicates a number of updates of status information in the terminal apparatus,
   the second progression information indicates a number of updates of status information in the another terminal apparatus,
   the input information indicates a message input by a user of the another terminal apparatus, and
   the output information comprises display information indicating an image including the message.

17. A game system including a plurality of terminal apparatuses for progressing a game, the game system comprising:
   a first game progressor configured to progress the game in which a first terminal apparatus among the plurality of terminal apparatuses is competing against a second terminal apparatus among the plurality of terminal apparatuses to which the first terminal apparatus is connected over a network in the first terminal apparatus based on content information that prescribes progression contents of the game for both the first terminal apparatus and the second terminal apparatus;
   a second game progressor configured to progress the game in a second terminal apparatus based on the content information;
   a first acquirer in the first terminal apparatus, the first acquirer configured to acquire first progression information indicative of a degree of progress of the game in the first terminal apparatus, wherein the first progression information includes a first virtual elapsed time corresponding to a duration that the game has been running;
   a second acquirer in the first terminal apparatus, the second acquirer configured to acquire, from the second terminal apparatus, input information that was input at the second terminal apparatus, and second progression information indicative of a degree of progress of the game in the second terminal apparatus as of a point in time when the input information was input at the second terminal apparatus, wherein the second progression information includes a second virtual elapsed time corresponding to a duration that the game has been running; and
   an output controller configured to compare the first virtual elapsed time acquired by the first acquirer and the second virtual elapsed time acquired by the second acquirer,
   wherein when the second virtual elapsed time indicated by the second progression information is greater than the first virtual elapsed time indicated by the first progression information, the output controller is configured to control output of output information to prohibit the output information from being output.

18. The game system according to claim 17, wherein the first progression information indicates a number of updates of status information in the first terminal apparatus, and the second progression information indicates a number of updates of status information in the second terminal apparatus.

19. The game system according to claim 17, wherein the input information indicates a message input by a user of the second terminal apparatus, the output information comprises display information indicating an image including the message, and the output controller is further configured to exclude the message from the display information in response to the second virtual elapsed time being greater than the first virtual elapsed time.

20. The game system according to claim 17, wherein:
   the first progression information indicates a number of updates of status information in the first terminal apparatus,
   the second progression information indicates a number of updates of status information in the second terminal apparatus,
   the input information indicates a message input by a user of the second terminal apparatus, and
   the output information comprises display information indicating an image including the message.

* * * * *